United States Patent
Dooley et al.

(10) Patent No.: US 11,287,262 B2
(45) Date of Patent: Mar. 29, 2022

(54) VISUAL NAVIGATION FOR MOBILE DEVICES OPERABLE IN DIFFERING ENVIRONMENTAL LIGHTING CONDITIONS

(71) Applicant: Labrador Systems, Inc., Oak Park, CA (US)

(72) Inventors: Michael Dooley, Pasadena, CA (US);
Nikolai Romanov, Oak Park, CA (US);
James Philip Case, San Francisco, CA (US)

(73) Assignee: Labrador Systems, Inc., Oak Park, CA (US)

( * ) Notice: Subject to any disclaimer, the term of this patent is extended or adjusted under 35 U.S.C. 154(b) by 0 days.

(21) Appl. No.: 17/257,472

(22) PCT Filed: Jul. 15, 2019

(86) PCT No.: PCT/US2019/041846
§ 371 (c)(1),
(2) Date: Dec. 31, 2020

(87) PCT Pub. No.: WO2020/014706
PCT Pub. Date: Jan. 16, 2020

(65) Prior Publication Data
US 2021/0164785 A1 Jun. 3, 2021

Related U.S. Application Data

(60) Provisional application No. 62/697,520, filed on Jul. 13, 2018.

(51) Int. Cl.
*G01C 21/20* (2006.01)
*H04N 13/254* (2018.01)
(Continued)

(52) U.S. Cl.
CPC ......... *G01C 21/206* (2013.01); *H04N 5/2352* (2013.01); *H04N 5/247* (2013.01); *H04N 13/239* (2018.05); *H04N 13/254* (2018.05)

(58) Field of Classification Search
CPC .. G01C 21/206; H04N 13/254; H04N 13/239; H04N 5/2352; H04N 5/247
(Continued)

(56) References Cited

U.S. PATENT DOCUMENTS 8,779,681 B2 7/2014 Adler
9,037,396 B2 5/2015 Pack et al.
(Continued)

FOREIGN PATENT DOCUMENTS

WO 2017139871 A1 8/2017
WO 2019089923 A1 5/2019

OTHER PUBLICATIONS

Extended European Search Report for European Patent Application No. 19835081.1 dated Jul. 21, 2021, 8 pages.
(Continued)

*Primary Examiner* — Allen C Wong
(74) *Attorney, Agent, or Firm* — Withrow & Terranova, PLLC; Vincent K. Gustafson

(57) ABSTRACT

A visual positioning system for mobile devices includes at least one infrared camera, at least one infrared illumination source, and a processor that coordinates operation of the at least one camera and illumination sources. A flood IR infrared illumination source illuminates environmental objects for localization of the mobile device during a first camera exposure window, and a structured IR illumination source illuminate environmental objects for detection and mapping of obstacles during a second camera exposure window. A visual SLAM map is constructed with images obtained from a first camera, with a single map being (Continued)

useable for positioning and navigation across a variety of environmental lighting conditions. A method for training a robot includes receiving operator input signals configured to start and stop recording of defined routes during the guiding of the mobile robot along paths between different pairs of desired robot destinations, such that routes for subsequent use by the robot are generated for paths imaged while recording is active.

24 Claims, 9 Drawing Sheets

(51) Int. Cl.
  *H04N 13/239* (2018.01)
  *H04N 5/235* (2006.01)
  *H04N 5/247* (2006.01)

(58) Field of Classification Search
  USPC .......................................................... 348/47
  See application file for complete search history.

(56) References Cited

U.S. PATENT DOCUMENTS

| | | | |
|---|---|---|---|
| 9,323,250 B2 | 4/2016 | Wang et al. | |
| 9,329,598 B2 | 5/2016 | Pack et al. | |
| 9,785,149 B2 | 10/2017 | Wang et al. | |
| 9,872,359 B2 | 1/2018 | Adler | |
| 2014/0350839 A1 | 11/2014 | Pack et al. | |
| 2017/0142312 A1* | 5/2017 | Dal Mutto | H04N 13/239 |
| 2018/0196998 A1 | 7/2018 | Price et al. | |
| 2019/0258058 A1 | 8/2019 | Fortin-Deschenes et al. | |
| 2019/0304116 A1* | 10/2019 | Price | G06T 7/593 |
| 2019/0384309 A1* | 12/2019 | Silva | G08G 1/166 |

OTHER PUBLICATIONS

Notification of Transmittal of the International Search Report and Written Opinion (Form PCT/ISA/220), International Search Report (Form PCT/ISA/210), and Written Opinion (Form PCT/ISA/237) for International Application No. PCT/US2019/041846, dated Nov. 20, 2019 (15 pages).

Notification Concerning Transmittal of International Preliminary Report on Patentability (Form PCT/IB/326) and International Preliminary Report on Patentability (Form PCT/IB/373) for International Application No. PCT/US2019/041846, dated Jan. 28, 2021 (12 pages).

\* cited by examiner

VISUAL NAVIGATION FOR MOBILE DEVICES OPERABLE IN DIFFERING ENVIRONMENTAL LIGHTING CONDITIONS

CROSS-REFERENCE TO RELATED APPLICATION(S)

This application is the U.S. national phase under 35 U.S.C. § 371 of International Application No. PCT/US2019/041846 filed on Jul. 15, 2019 and further claims priority to U.S. Provisional Patent Application No. 62/697,520 filed on Jul. 13, 2018, wherein the entire contents of the foregoing applications are hereby incorporated by reference herein.

TECHNICAL FIELD

The present invention relates generally to navigation of mobile devices (including but not limited to autonomous vehicles, mobile delivery robots, and user-positioned devices such as wearable devices, entertainment devices, and mobility assistance devices), and more particularly to navigation for such devices in dynamic unstructured environments.

BACKGROUND

A wide variety of Automated Guided Vehicles (AGVs) have been used to automatically transport items within manufacturing and warehouse settings for several decades. These environments are typically structured for use with robots (e.g., by provision of machine-readable landmarks), usually with few dynamic changes in terms of new or unexpected obstacles, and are typically provided with consistent lighting conditions. Over time, versions of these AGVs have been adapted for use in other settings such as hospitals, laboratories, and office environments to carry and deliver items.

In robotics, mapping and navigation are the most important enabling technologies for many real-world applications. Developments in mapping and navigation are areas of active research by academia and industry. Two of the most popular technologies are laser Simultaneous Localization and Mapping (laser SLAM) and visual SLAM. Due to the high cost of the quality Light Detection and Ranging (LIDAR) systems and the size, field of view, and power requirements of LIDAR sensors, laser SLAM is used predominantly in industrial and commercial applications. Visual SLAM was developed as an alternative to laser SLAM to leverage cameras as a more flexible alternative sensor for localization, while also promising the potential to map real-world environments that are more complex than the limited two-dimensional (2D) maps that are generated by LIDAR systems and utilized for navigation. Powered by advances in affordable processors and CMOS imagers, visual SLAM has become the de facto choice for consumer electronic applications, where component price, size, portability, and power consumption are major factors to commercial viability.

In the last several years, visual SLAM has experienced tremendous growth in development of high fidelity, low-cost, and computationally efficient implementations. Examples include augmented reality applications and visual positioning systems for wearable headsets, as well as mobile devices for a variety of entertainment, informational, and utility applications Such implementations have dramatically increased the richness of visual reference points used to build visual maps in a variety of settings, and have also increased the speed and accuracy of the visual SLAM system. Modern SLAM systems often now operate as three-dimensional (3D) models of the physical environment that can be processed in real-time speeds.

While visual SLAM has advanced for augmented reality and mobile devices, the field has not progressed as far outside of the typical product requirements and desired feature set of these specific types of devices. As an example, multiple challenges remain in adapting these advances for consumer robotics applications. Commercially available visual SLAM systems suffer poor performance or complete failure under changing lighting conditions routinely experienced by robots while operating in real indoor and/or outdoor environments. To address these issues, a user wearing an augmented reality gaming headset can be directed to turn on additional lighting in the user's room to play a game, or the game can pause to load while the headset recalibrates to a new visual map. In contrast, robots often need to operate without interruption or external assistance. Also, most modern implementations fail to take into consideration lifetime maintenance of visual SLAM maps and cannot guarantee reliable navigation performance over a multi-year service life of a robot. Many problems, such as unbounded map file growth and an extremely high computational cost of incremental map updates, limit the usability of visual SLAM.

In consequence of the foregoing, the art seeks improved visual navigation systems for mobile devices and associated methods to address limitations associated with conventional systems and methods.

SUMMARY

Aspects of the present disclosure relate to visual positioning systems and methods (including training methods) for mobile devices. Visual positioning systems disclosed herein include at least one camera configured to detect infrared wavelengths as well as at least one infrared illumination source. A flood infrared illumination source may be used to illuminate objects in an environment for localization (e.g., confirming location) of a mobile device, and a structured infrared illumination source may be used to illuminate objects for detection and mapping of obstacles (both static and dynamic) in the environment. Operation of the at least one camera and the illumination sources is coordinated by at least one processor such that the flood infrared illumination source is active during a first illumination interval and the structured infrared illumination source is active during a second illumination interval. The at least one camera may include a first camera having the first illumination interval and a second (e.g., depth) camera having the second illumination interval. A visual Simultaneous Localization and Mapping (visual SLAM) map may be constructed using images obtained with the first camera. Coordination of the camera(s) and illumination sources, and selection of the camera(s) and output intensity of at least the flood infrared illumination source, provides consistent exposure of images to enable localization and navigation of the mobile device using a single visual SLAM map in a variety of environmental lighting conditions. A method for rapidly training a mobile robot to autonomously navigate an unstructured residential environment is further provided, and includes receiving operator input signals from an operator interface associated with the mobile robot, wherein the operator input signals are configured to start and stop recording of defined routes during the guiding of the mobile robot along paths between different pairs of desired robot destinations, wherein the defined routes identify routes to be used by the mobile robot during subsequent positioning and navigation operations. A visual SLAM map is created of at least a portion of the unstructured residential environment from images of surroundings recorded by the mobile robot during the guiding of the mobile robot along the paths. A visual SLAM map may be created without prior exploration of the unstructured residential environment by the mobile robot and without prior establishment of any visual SLAM map of the unstructured residential environment.

In one aspect, the disclosure relates to a visual positioning system for a mobile device, the visual positioning system comprising a first camera, a flood infrared illumination source, and at least one processor. The first camera includes a global shutter, is configured to detect infrared wavelengths, and is configured to supply images captured by the first camera to a visual simultaneous localization and mapping (visual SLAM) module. The first camera has an exposure interval and a non-exposure interval, and is configured to automatically cycle between the exposure interval and the non-exposure interval of the first camera. The flood infrared illumination source is configured to generate substantially unstructured emissions and cyclically illuminate an environment within a field of view of the first camera. The at least one processor is configured to control operation of the first camera and the flood infrared illumination source. Operation of the first camera and the flood infrared illumination source is coordinated such that the flood infrared illumination source is configured to be active during at least a portion of the exposure interval of the first camera, and the flood infrared illumination source is configured to be inactive during at least a portion of the non-exposure interval of the first camera. Additionally, the processor is configured, and both a sensitivity of the first camera and an output intensity of the flood infrared illumination source are selected, to provide consistent exposure of images obtained by the first camera to enable localization and navigation of the mobile device using a single visual SLAM map across a variety of environmental lighting conditions.

In certain embodiments, the variety of environmental lighting conditions includes any daytime and nighttime lighting conditions generated by natural light sources. In certain embodiments, the variety of environmental lighting conditions includes any conventionally obtained interior residential lighting conditions including emissions of natural and/or artificial light sources. In certain embodiments, the variety of environmental lighting conditions includes any conventionally obtained interior commercial lighting conditions including emissions of natural and/or artificial light sources. In certain embodiments, the variety of environmental lighting conditions includes a first lighting condition comprising illumination by one or more natural or artificial light sources, and includes a second condition being devoid of illumination by any natural light source and by any artificial light source.

In certain embodiments, the variety of environmental lighting conditions encompasses a dynamic range spanning at least 10,000 lux. In certain embodiments, the variety of environmental lighting conditions encompasses a range of from about 0 lux to about 10,000 lux, or a range of from about 0 lux to about 50,000 lux, or another range specified herein.

In certain embodiments, the environment comprises an interior area of a residential building, an office building, or a commercial building. In certain embodiments, the environment comprises at least one wall or ceiling visible to the first camera within a distance of 20 meters of an area mapped by the visual SLAM module.

In certain embodiments, the flood infrared illumination source is configured to provide a peak infrared illumination level at a distance of 10 meters within the field of view of the first camera of at least 5 $\mu W/cm^2$ for a plurality of exposure intervals of the first camera.

In certain embodiments, a visual positioning system further comprises an optical filter configured to reduce passage of non-infrared wavelengths from the environment to the first camera. In certain embodiments, the optical filter comprises an optical bandpass filter having a center wavelength within about 10 nm of a peak emission wavelength of the flood infrared illumination source. In certain embodiments, the optical filter comprises an optical longpass (which may also be referred to as high-pass) filter having a cut-on wavelength within about 50 nm of a peak emission wavelength of the flood infrared illumination source.

In certain embodiments, the at least one processor is configured to (i) evaluate exposure of images captured by the first camera, and (ii) vary the exposure interval of the first camera responsive to the evaluation of exposure of the images.

In certain embodiments, the at least one processor is configured to (i) evaluate exposure of images captured by the first camera, and (ii) vary a level of illumination provided by the flood infrared illumination source responsive to the evaluation of exposure of the images. In certain embodiments, the flood infrared illumination source is configured to provide infrared illumination at a preset level of intensity during the exposure interval of the first camera.

In certain embodiments, a visual positioning system further comprises at least one inertial measurement unit configured to supply to the visual SLAM module signals indicative of changes in orientation and acceleration of the mobile device.

In certain embodiments, the flood infrared illumination source is configured to generate emissions having a peak wavelength in a range of from 780 nm to 980 nm.

In certain embodiments, the first camera comprises at least one monocular infrared camera. In certain embodiments, the first camera comprises at least one stereo infrared camera.

In certain embodiments, a visual positioning system further comprises: at least one second camera configured to detect infrared wavelengths; and a structured infrared illumination source configured to cyclically illuminate an environment within a field of view of the at least one second camera with a structured infrared illumination pattern during a structured illumination interval; wherein at least a portion of the field of view of the at least one second camera overlaps with the field of view of the first camera; wherein operation of the at least one second camera and the structured illumination source is coordinated such that an exposure interval of the at least one second camera overlaps with at least a portion of the structured illumination interval; and wherein the structured illumination source is inactive during the exposure interval of the first camera. In certain embodiments, the flood infrared illumination source is inactive during the exposure interval of the second camera.

In certain embodiments, a visual positioning system further comprises a data storage unit associated with the mobile device and configured to communicate with the visual SLAM module.

In certain embodiments, a visual positioning system further comprises at least one sensor associated with the mobile device, wherein the visual positioning system is configured for recording (i) video information and/or images captured by the first camera, and (ii) sensory information provided by at least one sensor, during manual or autonomous navigation of the mobile device within an environment.

In certain embodiments, the at least one processor is configured for processing recorded video information and/or images captured by the first camera, and for processing sensory information provided by the at least one sensor, to create and/or update the visual SLAM map of the environment. In certain embodiments, the at least one processor is further configured to execute the visual SLAM module.

In certain embodiments, the visual SLAM module is configured to utilize detection and mapping of visual features within the environment to create and/or update the visual SLAM map of the environment.

In another aspect, the present disclosure relates to a visual positioning system for a mobile device, comprising least one camera configured to detect infrared wavelengths, and configured to supply images to a visual SLAM module; a first infrared illumination source; a second infrared illumination source; and at least one processor configured to control operation of the at least one camera, the first infrared illumination source, and the second infrared illumination source. The first infrared illumination source is configured to provide substantially non-structured, flood illumination of an environment within a field of view of the at least one camera during a first illumination interval. The second infrared illumination source is configured to provide a structured infrared illumination pattern within an environment within a field of view of the at least one camera during a second illumination interval. The at least one camera includes a first exposure interval and a second exposure interval. The first exposure interval at least partially overlaps with the first illumination interval, with the second infrared illumination source being inactive during the first exposure interval. The second exposure interval at least partially overlaps with the second illumination interval.

In certain embodiments, the flood infrared illumination source is inactive during the second exposure interval.

In certain embodiments, the at least one camera comprises a first camera and a second camera; the first infrared illumination source is configured to provide substantially non-structured, flood illumination of an environment within a field of view of the first camera during a first illumination interval; the second infrared illumination source is configured to provide the structured infrared illumination pattern in an environment within a field of view of the second camera during a second illumination interval; the first camera comprises the first exposure interval; the second camera comprises the second exposure interval; and at least a portion of the field of view of the second camera overlaps with the field of view of the first camera. In certain embodiments, the flood infrared illumination source is inactive during the second exposure interval.

In certain embodiments, the first camera comprises a global shutter.

In certain embodiments, a visual positioning system further comprises an optical filter configured to reduce passage of non-infrared wavelengths from the environment to the first camera. In certain embodiments, the optical filter comprises an optical bandpass filter having a center wavelength within about 10 nm of a peak emission wavelength of the flood infrared illumination source. In certain embodiments, the optical filter comprises an optical longpass filter having a cut-on wavelength within about 50 nm of a peak emission wavelength of the flood infrared illumination source.

In certain embodiments, the at least one processor is configured to (i) evaluate exposure of images captured by the first camera, and (ii) vary the exposure interval of the first camera responsive to the evaluation of exposure of images captured by the first camera.

In certain embodiments, a visual positioning system further comprises at least one inertial measurement unit configured to supply to the visual SLAM module signals indicative of changes in orientation and acceleration of the mobile device.

In certain embodiments, at least one of the first infrared illumination source or the second infrared illumination source is configured to generate emissions having a peak wavelength in a range of from 780 nm to 980 nm.

In certain embodiments, the at least one camera comprises at least one monocular infrared camera. In certain embodiments, the at least one camera comprises at least one stereo infrared camera.

In certain embodiments, a visual positioning system further comprises a data storage unit associated with the mobile device and configured to communicate with the visual SLAM module.

In certain embodiments, a visual positioning system further comprises at least one sensor associated with the mobile device, wherein the visual positioning system is configured for recording (i) video information and/or images captured by the at least one camera, and (ii) sensory information provided by at least one sensor, during manual or autonomous navigation of the mobile device within an environment.

In certain embodiments, the at least one processor is configured for processing recorded video information and/or images captured by the at least one camera, and for processing sensory information provided by the at least one sensor, to create and/or update a visual SLAM map of the environment.

In certain embodiments, the visual SLAM module is configured to utilize detection and mapping of visual features within the environment to create and/or update a visual SLAM map of the environment.

Certain embodiments are directed to a mobile device comprising a visual positioning system as disclosed herein. In certain embodiments, the mobile device comprises an autonomous or semi-autonomous mobile vehicle. In certain embodiments, the mobile vehicle comprises a plurality of actively driven wheels or rotary tracks, each actively driven wheel or track comprises an encoder configured to sense rotation of the actively driven wheel or track, and the mobile device is configured to supply wheel or track rotation information sensed by each encoder to the visual SLAM module. In certain embodiments, the mobile device comprises an autonomous retrieval and/or delivery robot configured for residential use. In certain embodiments, the mobile device comprises an autonomous retrieval and/or delivery robot configured for commercial or industrial use. In certain embodiments, the mobile device comprises a wearable device is configured to be worn by a human or animal user. In certain embodiments, the mobile device comprises a mobility assistance device configured to be used by a human user.

In another aspect, the present disclosure relates to a method for rapidly training a mobile robot configured for autonomous operation to navigate an unstructured residential environment, the method comprising: identifying a set of desired robot destinations within the unstructured residential environment, wherein the set of desired robot destinations comprises at least four desired robot destinations; guiding the mobile robot along paths between at least a minimum number of different pairs of desired robot destinations of the set of desired robot destinations to enable establishment of full connectivity between each different pair of desired robot destinations; receiving operator input signals from an operator interface associated with the mobile robot, wherein the operator input signals are configured to start and stop recording of defined routes during the guiding of the mobile robot along the paths, wherein the defined routes identify routes to be used by the mobile robot during subsequent positioning and navigation operations; recording images of surroundings experienced by the mobile robot during the guiding of the mobile robot along the paths; and creating a visual SLAM map of at least a portion of the unstructured residential environment from the recorded images.

In certain embodiments, the method further comprises mapping locations of the defined routes and desired robot destinations in the visual SLAM map of the at least a portion of the unstructured residential environment.

In certain embodiments, the method further comprises identifying overlaps or intersections between visual SLAM mapping information for different routes of the defined routes.

In certain embodiments, the creating of the visual SLAM map is performed without prior establishment of any visual SLAM map for the unstructured residential environment.

In certain embodiments, the creating of the visual SLAM map is performed without prior exploration of the unstructured residential environment by the mobile robot.

In certain embodiments, the method further comprises utilizing detection and mapping of visual features within the unstructured residential environment to create and/or update the visual SLAM map.

In certain embodiments, the defined routes constrain the mobile robot to operate only within a pre-defined or operator-defined distance of the defined routes, unless operation of the mobile robot outside the pre-defined or operator-defined distance of the defined routes is otherwise permitted by an operator of the mobile robot.

In certain embodiments, the method further comprises updating the visual SLAM map by an operator guiding the mobile robot along at least one path connecting at least one pair of newly identified or previously identified desired robot destinations, wherein the at least one path either overlaps a previously defined route or comes within a specified proximity of a previously defined route.

In certain embodiments, the method further comprises displaying at least one of (i) identification of desired robot destinations or (ii) identification of defined routes, plus identification of position of the mobile robot, on a visual user interface.

In certain embodiments, the mobile robot comprises (i) at least one first camera configured to detect infrared wavelengths, (ii) a first infrared illumination source configured to provide substantially non-structured, flood illumination of surroundings within a field of view of the at least one first camera, and (iii) at least one processor configured to control operation of the at least one first camera. In such an embodiment, the recording of images of surroundings experienced by the mobile robot comprises illuminating objects within a field of view of the at least one first camera during a plurality of first illumination intervals, and recording images during each illumination interval of the plurality of first illumination intervals using the at least one first camera.

In certain embodiments, the mobile robot further comprises at least one second camera configured to detect infrared wavelengths, and a structured infrared illumination source configured to cyclically illuminate surroundings within a field of view of the at least one second camera with a structured infrared illumination pattern during a structured illumination interval, wherein at least a portion of the field of view of the at least one second camera overlaps with the field of view of the first camera, wherein operation of the at least one second camera and the structured illumination source is coordinated such that an exposure interval of the at least one second camera overlaps with at least a portion of the structured illumination interval, wherein the structured illumination source is inactive during the exposure interval of the first camera. In such an embodiment, the method further comprises: illuminating surroundings within a field of view of the at least one second camera with the structured infrared illumination pattern during the structured illumination interval, and capturing images of surroundings within the field of view of the at least one second camera during the structured illumination interval. In certain embodiments, the flood infrared illumination source is inactive during the exposure interval of the second camera.

In certain embodiments, the mobile robot comprises at least one sensor, and the method further comprises recording sensory information provided by the at least one sensor during the guiding of the mobile robot along the paths.

In certain embodiments, the mobile robot comprises an autonomous retrieval and/or delivery robot configured for residential use.

In certain embodiments, the method further comprises: causing the mobile robot to transit one or more routes and periodically capture images representative of 360 degree images of surroundings at multiple locations on the one or more routes; processing the periodically captured images; and supplementing the visual SLAM map using information obtained by the processing of the periodically captured images.

In another aspect, any of the foregoing aspects, and/or various separate aspects and features as described herein, may be combined for additional advantage. Any of the various features and elements as disclosed herein may be combined with one or more other disclosed features and elements unless indicated to the contrary herein.

Other aspects, features and embodiments of the present disclosure will be more fully apparent from the ensuing disclosure and appended claims.

BRIEF DESCRIPTION OF DRAWINGS

The accompanying drawings and the following claims are included to provide a further understanding of the subject matter of the present disclosure, and are incorporated into and constitute a part of this specification. The drawings illustrate various embodiments of the subject matter of the present disclosure and together with the description serve to explain the principles and operations of the subject matter of the present disclosure.

DETAILED DESCRIPTION

Figure 1:
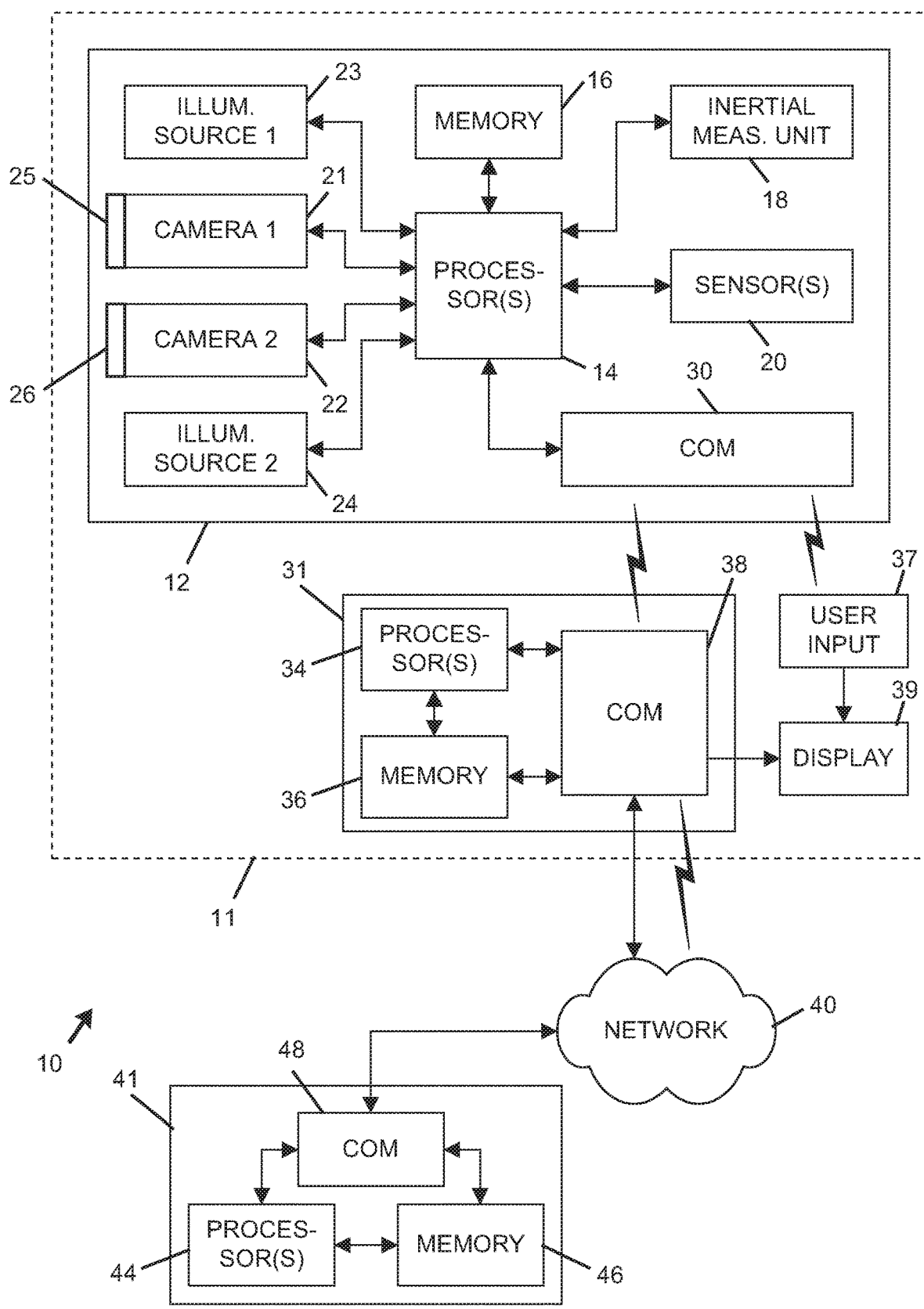
FIG. 1 is a schematic diagram illustrating interconnections between various components of an exemplary visual positioning system for a mobile device according to one embodiment of the present disclosure.

Visual positioning systems and related methods for mobile devices utilize at least one camera (optionally embodied in first and second cameras) configured to detect infrared wavelengths, at least one infrared illumination source, and at least one processor. A flood infrared illumination source may be used to illuminate objects in an environment for localization (e.g., confirming location) of a mobile device, and a structured infrared illumination source may be used to illuminate objects for detection and mapping of obstacles (both static and dynamic) in the environment. Operation of the at least one infrared camera and the illumination sources is coordinated by the at least one processor such that the flood infrared illumination source is active during a first illumination interval and the structured infrared illumination source is active during a second illumination interval. A first infrared camera may be utilized in conjunction with the flood infrared illumination source for localization of the mobile device within an environment, and a second infrared camera (e.g. a depth camera) may be utilized in conjunction with the structured infrared illumination source to illuminate objects for detection and mapping of obstacles (both static and dynamic) in the environment. Images obtained by the first infrared camera may be used to create a visual Simultaneous Localization and Mapping (visual SLAM) map of an environment of the mobile device. Coordination of the camera(s) and illumination sources, and selection of the camera(s) and output intensity of at least the flood infrared illumination source, provides consistent exposure of images to enable localization and navigation of the mobile device using a single visual SLAM map in a variety of environmental lighting conditions.

The term "mobile device" as used herein broadly refers to a device that is subject to transit and/or positioning (either by its own motive power or by motive power supplied by a human or animal) within an environment. Non-limiting examples of mobile devices according to various embodiments include autonomous vehicles, mobile delivery and/or retrieval robots, and user-positioned devices such as wearable devices, entertainment devices, and mobility assistance devices.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only, and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly defined herein.

To overcome the performance degradation of existing visual navigation solutions under low or changing light conditions, embodiments herein include mobile devices provided with infrared illumination sources. A field of illumination provided by an infrared illumination source (e.g., a flood infrared illumination source) may be at least as large as a field of view of a corresponding camera associated with the mobile device. Illumination sources are selected to provide sufficient intensity, cameras are selected with sufficient sensitivity, and coordination between illumination sources and cameras are controlled by at least one processor, to provide consistent exposure of images sufficient to enable localization and navigation of the mobile device using a single visual SLAM map in a variety of environmental lighting conditions.

In certain embodiments, the term "variety of environmental lighting conditions" encompasses any daytime and nighttime lighting conditions generated by natural light sources. Such variety of environmental lighting conditions may encompass any conventionally obtained interior residential or interior commercial lighting conditions including emissions of natural and/or artificial light sources. In certain embodiments, the variety of environmental lighting conditions includes a first lighting condition comprising illumination by one or more natural or artificial light sources, and includes a second condition being devoid of illumination by any natural light source and by any artificial light source. In certain embodiments, the variety of environmental lighting conditions encompasses a dynamic range spanning at least 10,000 lux. In certain embodiments, the variety of environmental lighting conditions encompasses a range of from about 0 lux to about 10,000 lux, or a range of from about 0 lux to about 50,000 lux, or another range specified herein.

In certain embodiments, the flood infrared illumination source is configured to provide a peak infrared illumination level at a distance of 10 meters within the field of view of the first camera of at least 2, at least 5, at least 7, or at least 10 $\mu W/cm^2$ for a plurality of exposure intervals of the first camera.

In certain embodiments, a mobile device is configured to obtain properly exposed images of objects up to at least 5 meters, at least 8 meters, at least 10 meters, or at least 20 meters away from at least one infrared camera of the mobile device. In this context, "properly exposed" refers to the presence of sufficient light for successful extraction of visual features used by a chosen implementation of visual SLAM.

Infrared cameras as mentioned herein may include digital cameras incorporating CMOS or CCD imaging sensors. In certain embodiments, a camera may utilize a global shutter instead of a rolling shutter image scanning technique. An imaging sensor employing a rolling shutter technique scans an image sequentially from one side of the sensor (e.g., the top) to another in a line-by-line manner. In contrast, an imaging sensor employing a global shutter technique scans (or exposes) the entire area of an image simultaneously. Imaging performance according to embodiments herein can be significantly enhanced utilizing cameras with global shutter, by allowing strobing illumination only for the duration of exposure. Strobing illumination beneficially reduces the amount of energy used by the illumination source, and may also be utilized to reduce aggregate amounts of infrared emissions in an environment occupied by humans to enable compliance with eye safety standards.

Providing mobile devices with on-board environmental illumination helps minimize perceived changes in images that would be experienced with changing environmental light sources. In certain embodiments, infrared illumination generated by an illumination source of a mobile device may provide sufficient illumination to completely wash-out any external light sources (e.g., with external light sources providing an illumination level of up to 500 lux, up to 1000 lux, up to 2000 lux, up to 5000 lux, up to 10,000 lux, or up to 100,000 lux) and make images look practically the same under any conditions. In certain embodiments, infrared illumination may be generated by one or more solid state emitters such as light emitting diodes (LEDs), organic light emitting diodes, or the like.

In certain embodiments, an optical filter may be used to reduce passage of non-infrared wavelengths from the environment to an infrared camera to suppress environmental light sources. In certain embodiments, an optical filter may include an optical bandpass filter or a longpass filter. In certain embodiments, an optical filter comprises an optical bandpass filter having a center wavelength within about 10 nanometers (nm) (or within about 5 nm or about 2 nm) of a peak emission wavelength of a flood infrared illumination source. In certain embodiments, a peak wavelength of an illumination source may be an infrared wavelength at or near 850 nm, and an optical bandpass filter may comprise an interference based optical bandpass filter. In certain embodiments, an optical filter may comprises an optical longpass filter having a cut-on wavelength within about 50 nm (or within about 30 nm or within about 20 nm) of a peak emission wavelength of a flood infrared illumination source.

In certain embodiments, a mobile device includes at least one inertial measurement unit (IMU), which is an electronic device that can measure linear and angular motion (optionally in combination with orientation) of a body, usually with a triad of gyroscopes and a triad of accelerometers, optionally in conjunction with magnetometers. An IMU may be used to provide orientation and acceleration change information of the mobile device to a visual SLAM module. In certain embodiments, a mobile device includes one or more sensors. Examples of sensors that may be used include (but are not limited to) optical sensors, temperature sensors, pressure sensors, vibration sensors, sound sensors, contact sensors, moisture sensors, tilt sensors, and encoders (which may be associated with and used to sense rotation of actively driven wheels or rotary tracks of a mobile vehicle). In certain embodiments, signals from an IMU and/or one or more sensors may be used in conjunction with imaging information to assist with creating a visual SLAM map and/or with localizing and navigating a mobile device.

In certain embodiments, a mobile device includes one or more wireless and/or wired communication interfaces to permit communication with devices within and/or outside an environment containing the mobile device. In certain embodiments, a communication interface of a mobile device is configured to communicate (e.g., wirelessly) with at least one processing unit external to the mobile device but arranged locally within the environment containing the mobile device. In certain embodiments, a processing unit positioned locally within the environment but external to the mobile device comprises an associated memory, and comprises a dedicated wireless communication interface (e.g., configured to communicate at 900 MHz, 2.4 GHz, 5 GHz, or another frequency) to communicate with the mobile device, or is coupled with a wireless router configured to communicate with the mobile device. In certain embodiments, a communication interface of a mobile device is configured to communicate with at least one processing device located remotely from the environment containing the mobile device, via at least one wide-area network or the internet. In certain embodiments, processing devices external to the mobile device may be used to perform or assist with functions such as visual SLAM map creation, visual SLAM map augmentation and/or updating, troubleshooting, and software upgrades.

FIG. 1 is a schematic diagram illustrating interconnections between various components of an exemplary visual positioning system 10 for a mobile device 12 according to one embodiment of the present disclosure. The mobile device 12 is arranged within an environment 11, optionally embodied in an unstructured residential environment or a commercial environment. The mobile device 12 includes a processor 14 (e.g., at least one processor (optionally multiple processors) configured to execute machine-readable instructions such as software)) having an associated memory 16. An IMU 18 and one or more sensors 20 of the mobile device 12 may be arranged to provide signals to the processor 14. The processor 14 is configured to control first and second infrared cameras 21, 22 and associated first and second infrared illumination sources 23, 24. One or more of the infrared cameras 21, 22 may include optical filters 25, 26 to reduce passage of non-infrared wavelengths from the environment 11. In certain embodiments, a field of view of the first infrared camera 21 at least partially overlaps with a field of view of the second camera 22. In certain embodiments, the first infrared illumination source 23 includes a flood infrared illumination source configured to generate a substantially unstructured infrared emission pattern, and operation of the first infrared camera 21 is coordinated with the first infrared illumination source 23. In certain embodiments, the second infrared illumination source 24 includes a structured infrared illumination source configured to generate a structured infrared illumination pattern, and operation of the second infrared camera 22 is coordinated with the second infrared illumination source 24. In certain embodiments, the first infrared camera 21 has a first exposure interval (i.e., a repeating periodic exposure interval) that is coordinated with an illumination interval (i.e., a repeating periodic illumination interval) of the first infrared illumination source 23, and the second infrared camera 22 has a second exposure interval (i.e., a repeating periodic exposure interval) that is coordinated with an illumination interval (i.e., a repeating periodic illumination interval) of the second infrared illumination source 24. The mobile device 12 further includes a communication interface 30, which may be used to provide wireless and/or wired communication with one or more external devices.

A processing device 31 may be arranged external to the mobile device 12 but still within the environment 11. The processing device 31 may include a communication interface 38 as well as at least one processor 34 having an associated memory 36. The communication interface 38 may facilitate wired and/or wireless communication with the mobile device 12 and with a communication network 40 (optionally embodied in a wide-area network or the internet), such as to permit communication with at least one remote processing device 41. The remote processing device 41 may include a communication interface 48 as well as at least one processor 44 having an associated memory 46. In certain embodiments, processing devices 31, 41 external to the mobile device 12 may be used to perform or assist with functions such as visual SLAM map creation, visual SLAM map augmentation and/or updating, troubleshooting, and software upgrades.

With continued reference to FIG. 1, an operator interface or user input element 37 is provided to receive input signals configured to start and stop recording of defined routes (e.g., between pairs of desired robot destinations established by the user) used during a robot guiding step. As part of the robot guiding step, the mobile robot is guided (e.g., by the operator) along paths between different pairs of the desired robot destinations, and routes are established for paths imaged while recording is active. In certain embodiments, a display 39 (e.g., liquid crystal display, organic light emitting diode display, or the like) may be provided to serve as a visual user interface to display at least one of (i) identification of desired robot destinations or (ii) identification of defined routes, plus identification of position of the mobile robot, whether during a training process or during operation of the mobile robot. In certain embodiments, the display 39 may be used to notify an operator of status of creation of one or more routes, and/or overlaps between routes, while a robot is guided along paths during a robot guiding step.

Figure 2:
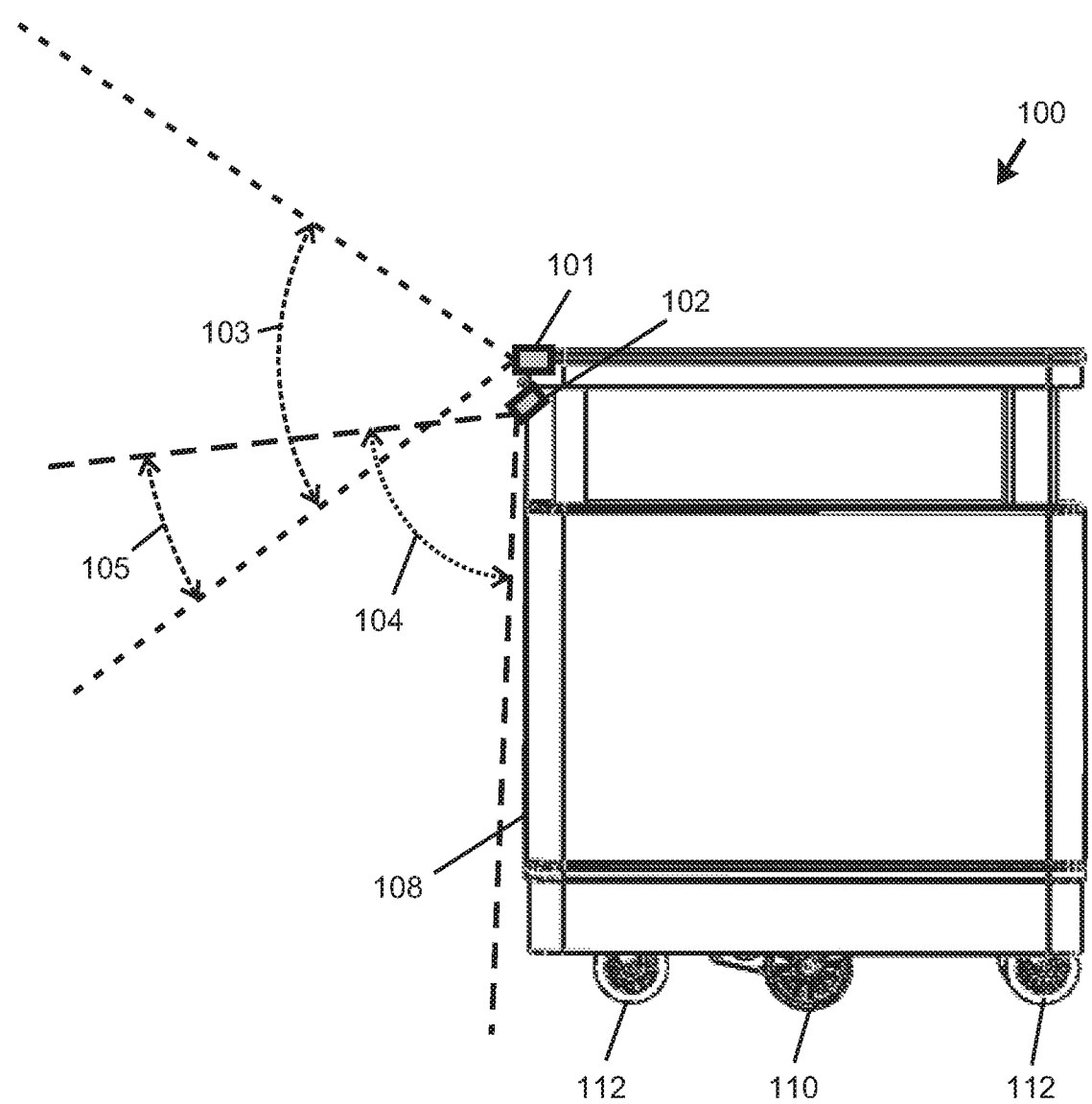
FIG. 2 is a side view illustration of a mobile robot including a visual positioning system as disclosed herein with first and second infrared illumination sources and first and second infrared cameras with overlapping fields of view.

FIG. 2 is a side view illustration of a mobile robot 100 including a visual positioning system as disclosed herein with first and second infrared cameras 101, 102 (having associated first and second infrared illumination sources, respectively (not shown)) with overlapping fields of view. The mobile robot 100 includes electrically powered drive wheels 110 (as well as undriven wheels 112) and a battery (not shown) to enable the mobile robot 100 to move within an environment under its own motive power. The first infrared camera 101 includes a first field of view 103, and the second infrared camera includes a second field of view 104 that partially overlaps with the first field of view 103 to yield an overlapping field of view 105. In certain embodiments, the second infrared camera 102 comprises a depth camera, and may optionally include multiple cameras. As shown, the second infrared camera 102 may be oriented forwardly and downwardly so that the second field of view 104 may be arranged to illuminate an environmental area closely ahead of a front 108 of the mobile robot 100 (e.g., to identify potential obstacles during navigation). The first infrared camera 101 may be oriented forwardly so that the first field of view 103 may be arranged to illuminate an environmental area generally forward and farther ahead of the front 108 of the mobile robot 100 (e.g., to recognize features in the environment for to assist in identifying location of the mobile robot 100). In certain embodiments, the first illumination source associated with the first infrared camera 101 comprises a flood infrared illumination source configured to generate substantially unstructured infrared emissions and cyclically illuminate an environment within the first field of view 103, and the second illumination source associated with the second infrared camera 102 comprises a structured infrared illumination source configured to generate infrared emissions having a structured pattern and cyclically illuminate an environment within the second field of view 104.

Structured infrared emission patterns are beneficial for use with a depth camera, but can interfere with feature identification by a camera used for localization, particularly when a field of view of a camera used for localization overlaps with a field of illumination of a structured infrared emission source. In certain embodiments, to mitigate this problem, an illumination interval of a structured infrared emission source (which may be coordinated with a depth camera exposure interval) is timed to stay out of sync with an exposure interval of a localization camera, so that infrared emission patterns are not subject to being imaged by the camera used for localization. In certain embodiments, a camera used for localization may be referred to herein as a first camera and have a first exposure interval, and a depth camera used for identification of obstacles may be referred to as a second camera and have a second exposure interval. In certain embodiments, a single camera (which may embody a stereo camera) may be used to provide both localization and obstacle detection, wherein imaging (detection) of objects illuminated by a flood infrared illumination source providing substantially non-structured illumination is performed during a first interval for localization, and imaging of objects illuminated by a structured infrared illumination source may be performed during a second interval.

Figure 3A:
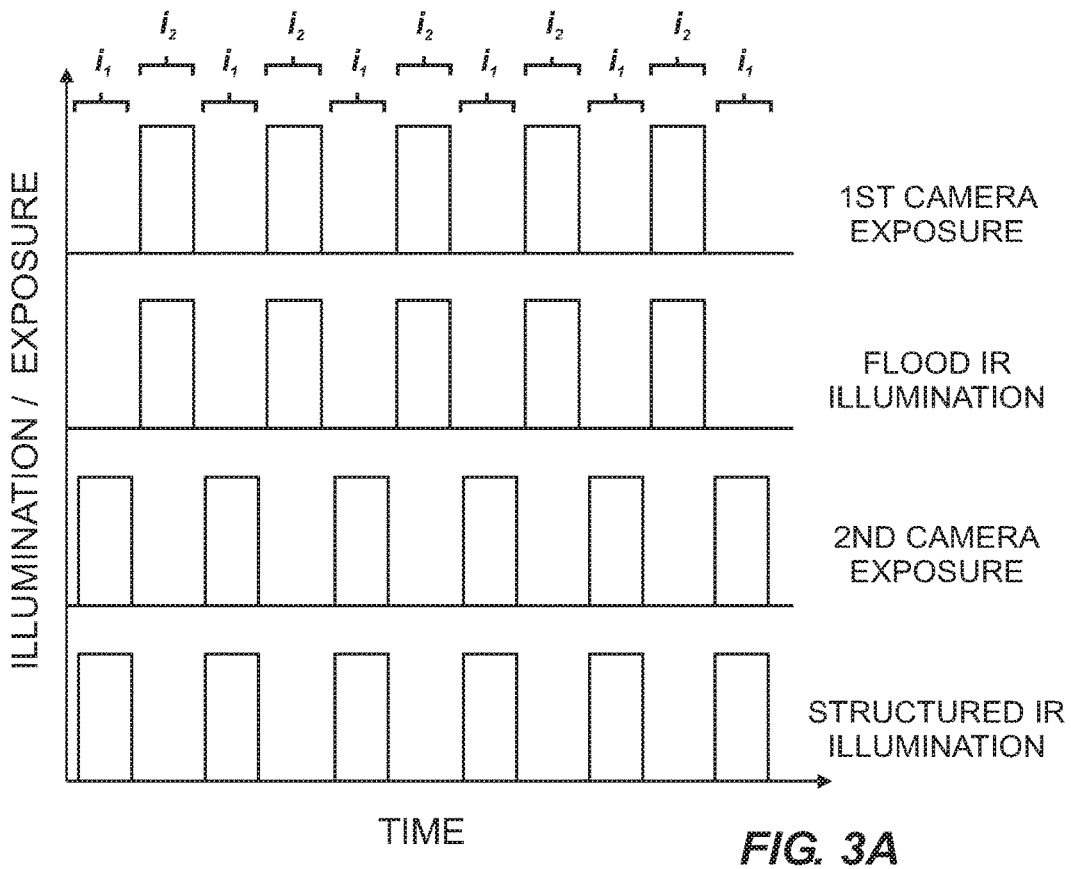
FIG. 3A provides activity time windows for a first infrared camera exposure interval, a flood infrared illumination source interval, a second infrared camera exposure interval, and a structured illumination source interval according to certain embodiments.

In certain embodiments, the first and second exposure intervals provided by at least one camera may be substantially synchronized with first and second illumination intervals of a flood infrared (first) illumination source and a structured infrared (second) illumination source, respectively, and the first and second exposure intervals may be sequential and non-overlapping. One illustration of such an arrangement is shown in FIG. 3A, which provides activity time windows for a first infrared camera exposure interval, a flood infrared illumination source interval, a second infrared camera exposure interval, and a structured illumination source interval. As shown, each first infrared camera exposure interval and each flood infrared illumination source interval corresponds to a first time interval $i_1$, and each second infrared camera exposure interval and each structured infrared illumination source interval corresponds to a second time interval $i_2$, wherein the first and second time intervals $i_1$ and $i_2$ are sequentially repeating and non-overlapping.

In certain embodiments, a camera used for localization may be oriented or pointed in such a way that an infrared pattern projected by the light source associated with a depth sensor does not overlap with the field of view of a visual SLAM camera.

Figure 3B:
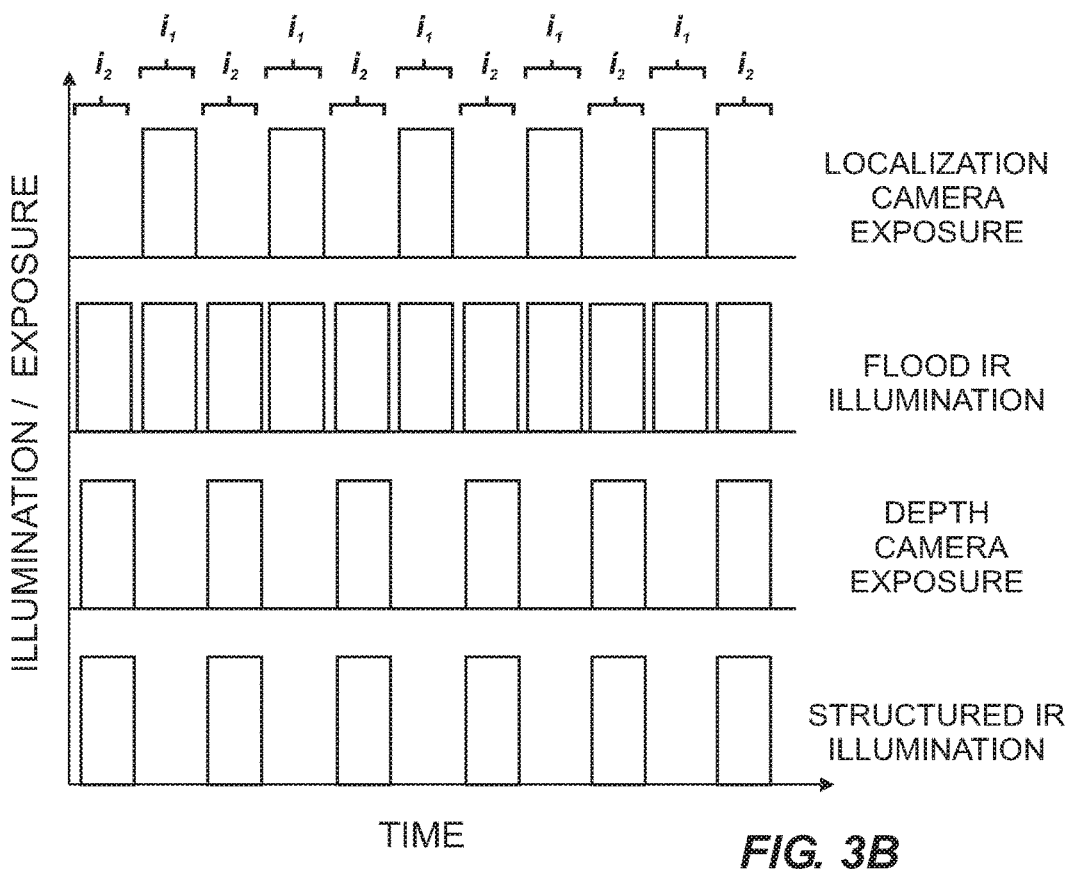
FIG. 3B provides activity time windows for a first infrared camera exposure interval, a flood infrared illumination source interval, a second infrared camera exposure interval, and a structured illumination source interval according to certain embodiments.

As noted previously, in certain embodiments, a single stereo camera-based depth sensor may be used to provide obstacle detection and localization (e.g., visual SLAM navigation), wherein imaging (detection) of objects illuminated by a flood infrared illumination source providing substantially non-structured illumination is performed during a first camera exposure interval for localization, and imaging of objects illuminated by a structured infrared illumination source may be performed during a second camera exposure interval. In such an embodiment, the illumination sources may be operated to interlace the structured illumination source on and off. In such an embodiment, a flood infrared illumination source may be used during the first camera exposure interval, and (optionally) also used during the second camera exposure interval (e.g., to aid the depth sensor stereo camera in low light or backlit conditions). An exemplary embodiment of an arrangement is illustrated in FIG. 3B. As shown, each localization camera exposure interval corresponds to an illumination interval of the flood infrared source during a first time interval $i_1$, and each depth camera exposure interval corresponds to an illumination interval of each of the flood infrared illumination source and the structured infrared illumination source during a second time interval $i_2$, wherein the first and second time intervals $i_1$ and $i_2$ are sequentially repeating and non-overlapping.

In certain embodiments, a flood infrared illumination source can be configured to be inactive during an exposure interval of a depth camera (e.g., a stereo camera of a depth sensor) while a structured infrared illumination source is active, to avoid interfering with a depth information extraction process. In certain embodiments, a state of being inactive may correspond to a state of being off, or being dimmed to a level in which emissive output will be insignificant or otherwise not impair performance of a visual SLAM module. In certain embodiments, a flood infrared illumination source can be configured to provide infrared illumination at a preset level of intensity during the exposure interval of the first camera and/or outside of the first exposure interval of the first camera. In certain embodiments, a level of intensity of the flood infrared illumination source can be varied (e.g., driven using pulse width modulation).

Figure 3C:
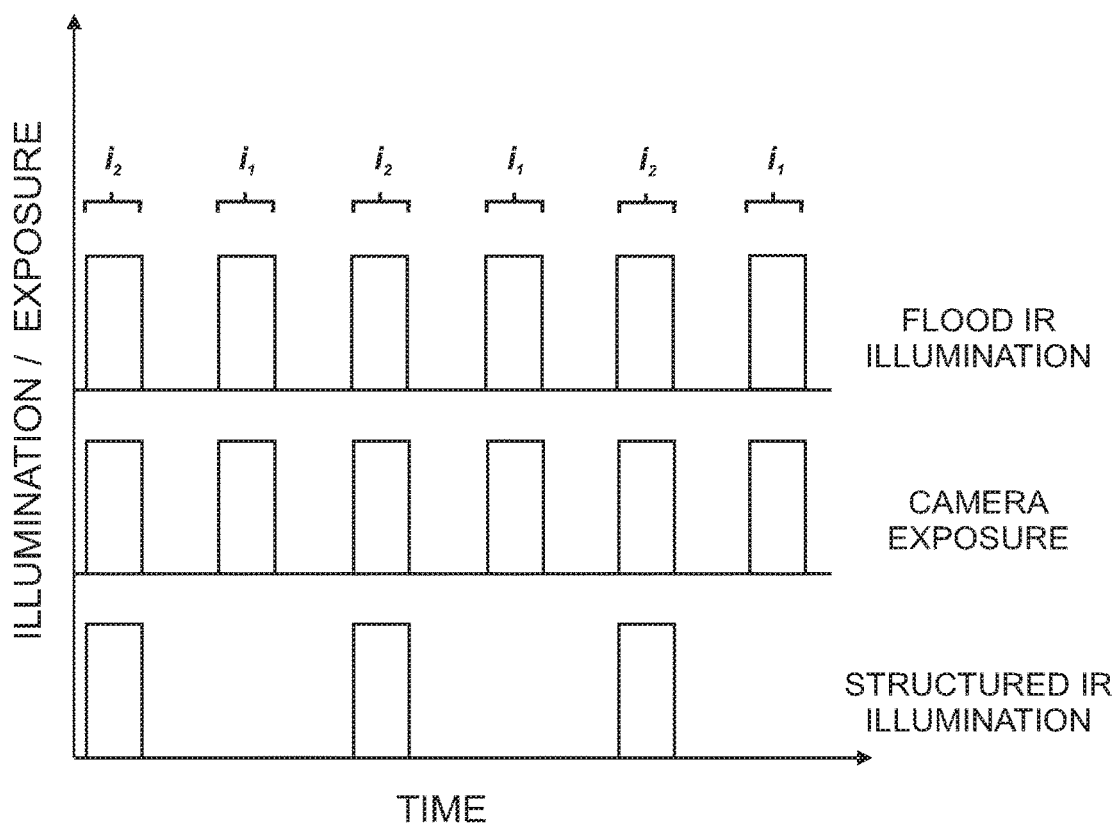
FIG. 3C provides activity time windows for a flood infrared illumination source interval, an infrared depth camera exposure interval, and a structured illumination source interval according to certain embodiments.

In certain embodiments, a flood infrared illumination source can be configured to be active during frames captured by a stereo camera of the depth sensor during periods when the structured infrared illumination source is active and during periods when the structured infrared illumination source is inactive. Such an arrangement is shown in FIG. 3C, wherein a flood infrared illumination source is active during each of the first and second time intervals $i_1$ and $i_2$; first and second camera exposure windows corresponding to respective first and second time intervals $i_1$ and $i_2$ of the same stereo infrared camera are used for localization and depth imaging, respectively; and a structured infrared illumination source is used only during the second camera exposure interval $i_2$. Augmentation of structured infrared illumination with emissions of a flood infrared emission source during an exposure interval of a stereo camera of a depth sensor can improve depth perception quality of some depth sensors in low light conditions and/or in high contrast or back-lit conditions.

Figure 3D:
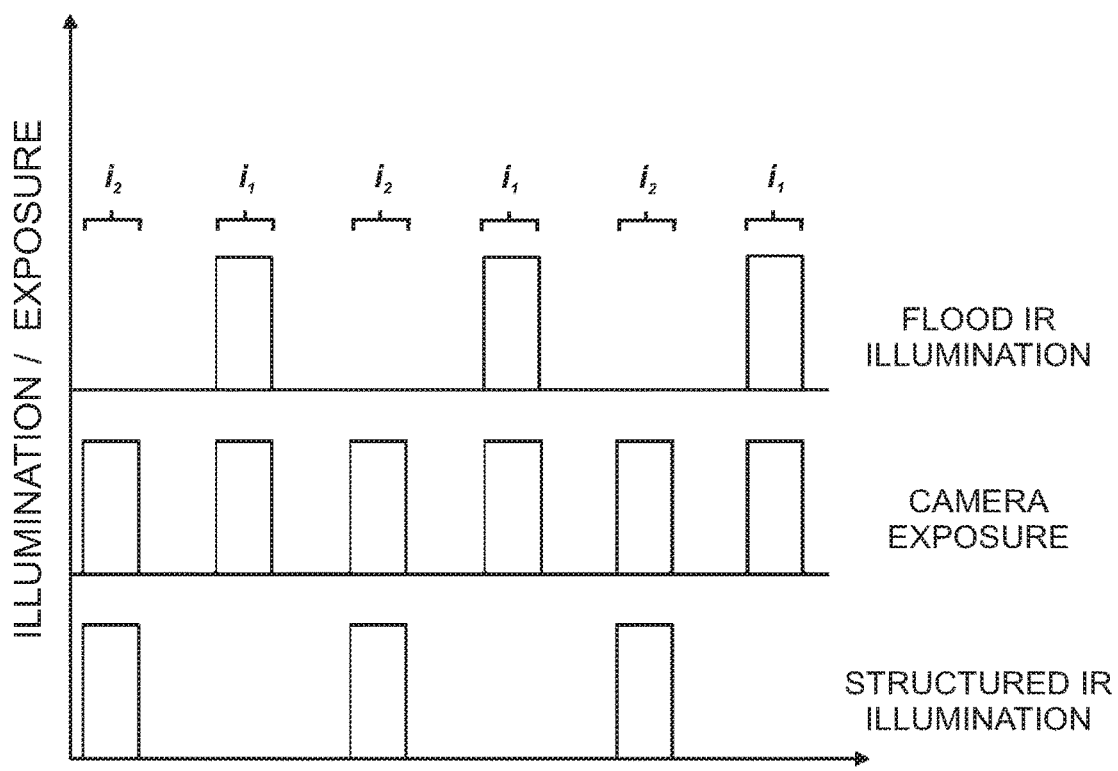
FIG. 3D provides activity time windows for a flood infrared illumination source interval, an infrared depth camera exposure interval, and a structured illumination source interval according to certain embodiments.

In certain embodiments, the flood infrared illumination source can be configured to be active during frames captured by a depth camera while the structured infrared illumination source is inactive. Such an arrangement is shown in FIG. 3D, wherein a flood infrared illumination source is active during each first time interval $i_1$; first and second camera exposure windows corresponding to respective first and second time intervals $i_1$ and $i_2$ of the same stereo infrared camera are used for localization and depth imaging, respectively; and a structured infrared illumination source is used only during the second camera exposure interval $i_2$.

In certain embodiments, a peak wavelength of a flood infrared illumination source can be configured to be the same as or close to the peak wavelength of a structured infrared illumination source. Further, in certain embodiments, a stereo camera of the depth sensor can be equipped with an optical filter (e.g., a bandpass or high-pass filter) approximately matching a peak wavelength of both infrared illumination sources.

In certain embodiments, to prevent a structured infrared illumination source from interfering with a camera used for localization, the camera used for localization (e.g., first camera) may be equipped with an optical filter having a peak transmission wavelength or cutoff wavelength that differs from a peak wavelength of a structured infrared illumination source associated with a depth camera. In certain embodiments, a camera used for localization (e.g., first camera) can be configured with a bandpass filter having a peak wavelength in the infrared region, with such peak wavelength differing from a peak wavelength of emissions of the structured infrared illumination source. In certain embodiments, the peak wavelength of a flood infrared illumination source can be configured to match or overlap with a center wavelength of an optical bandpass filter of a camera used for localization.

To keep the cost of computational hardware on a mobile device to the minimum, in certain embodiments the computationally intensive task of updating a visual SLAM map may be run during one or more times while the mobile device (e.g., robot) is idle. In certain embodiments, this may be accomplished by recording a video from the camera along with all necessary sensory data every time a mobile device navigates or is guided (e.g., pushed or pulled)

through the environment. Subsequently, the recorded information may be processed during one or more times that the mobile device is idle or otherwise has spare computational capacity. Such procedure allows computationally expensive tasks of updating the map to be run without imposing real-time operational constraints. In some applications, there may not be sufficient time to process all recorded information during the idle time of a mobile device. In certain embodiments, a queue, first-in-first-out regime, a stack, or similar methodology can be used to limit the amount of recorded video and sensory information for subsequent processing up to the available storage capacity based on time of recordings. In certain embodiments, a decision to keep the path for the processing may be determined based on the amount or density and 'age' of the visual features in a visual SLAM map along the path. If the visual feature density along the path is low or the features have been created a long time ago, then the path may be given priority for processing; otherwise a recording may be marked for deletion in case storage is needed for new recordings.

To limit the visual features map file size, in certain embodiments the geographical density of the features may be maintained in a visual SLAM map and limited by a preset number. In certain embodiments, the time of creation and last observation of each feature may also be maintained in a map. In certain embodiments, a counter may be maintained to log how many times each feature has been used for navigation. The preceding items of information can subsequently be used for deciding which features should be kept and which features should be discarded from the map. In certain embodiments, a mobile device may periodically trigger the process computing geographical density of the features. In areas where the density exceeds a pre-set number, oldest features may be discarded from the map to retain the preset density. In certain embodiments, areas with excessive density may be further evaluated based on the number of features in each bin of a histogram over time of day or temporal density over time of day. Then the oldest features in the periods of time of day with highest densities or number of features may be discarded. In certain embodiments, the features may be discarded based on their frequency or number of times observed and/or used for navigation, wherein the least-used features may be discarded first. In certain embodiments, the frequency of use in combination with age and/or last observation time may be used to decide which features should be discarded. If a feature is used frequently but has not been used for a specific period of time, such feature may be discarded before a feature that is less-frequently-used but has been added more recently to the map.

Reliable mapping and navigation are keys to providing a simple and satisfying user experience utilizing mobile devices such as self-navigating robots. Advances in the field combined with improvements outlined above allow creation of maps on a single pass through an environment to create maps sufficient for reliable navigation through the same environment. In certain embodiments, a robot or other mobile device may be guided (e.g., pushed or pulled) or remotely controlled along a desired path through the environment during a setup process. During this process, the robot records video and sensory information while transiting paths through the environment and either simultaneously or after the recording is complete, the robot builds a map and stores the path trajectory in the memory. This trajectory may be termed a 'route'. A single route may connect two points in an environment, allowing a robot to navigate from the starting point of the route to the end or destination point. Recording a sufficient number of routes between the points in the environment to which a robot has to navigate creates an initial route map. In certain embodiments, such a route map may be processed, finding all points where routes intersect and/or overlap, to build a traversable, modified route map similar to that of a subway map. The traversable, modified route map allows a robot to choose one or more possible routes connecting any two destinations. In certain embodiments, during a setup process, after each route is recorded, an initial route map is processed and a connectivity graph between all points is established. This connectivity graph can inform the setup process and inform if additional routes have to be recorded to achieve desired connectivity between destination points. In certain embodiments, a robot can be configured to find an optimal route through the traversable, modified route map to the desired destination. If the robot encounters an obstacle while navigating along the chosen route and cannot navigate around the obstacle within given constraints, then the robot may stop and wait for the path to clear. Examples of such constrains may include attaining a maximum distance deviating away from the chosen route. In certain embodiments, if a robot encounters an obstacle and cannot continue on the chosen route, the robot may consult the subway-like map to identify an alternative route, and upon identification of an alternative route, the robot may automatically utilize the alternative route.

Figure 4A:
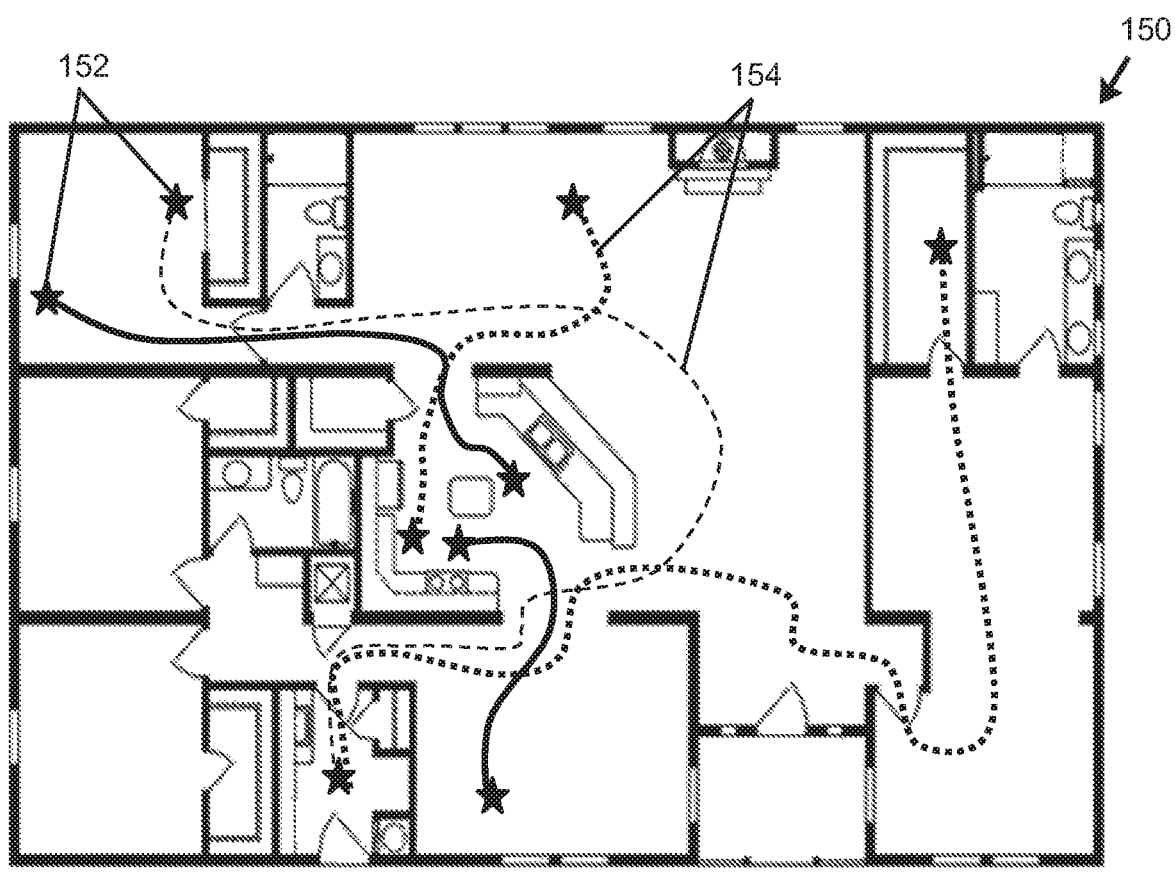
FIG. 4A is a top plan view illustration of a physical map of a home environment with superimposed identification of desired robot destinations and individual routes taken by a robot within the home environment between pairs of the desired robot destinations for creation of a route map useable by a mobile robot and/or training of a mobile robot according to certain embodiments.

FIG. 4A is a top plan view illustration of a physical map of a home environment 150 with superimposed identification of desired robot destinations 152 and individual routes 154 taken by a robot within the home environment 150 between pairs of the desired robot destinations 152 for creation of a route map useable by a mobile robot and/or training of a mobile robot according to certain embodiments. Each desired robot destination 152 may be selected by an operator, and individual routes 154 may be established during a training method by which an operator provides input signals configured to start and stop recording of defined routes used during a robot guiding step, such that when the mobile robot is guided (e.g., pushed by the operator) along paths between different pairs of the desired robot destinations 152, routes 154 are generated for paths imaged while recording is active.

Figure 4B:
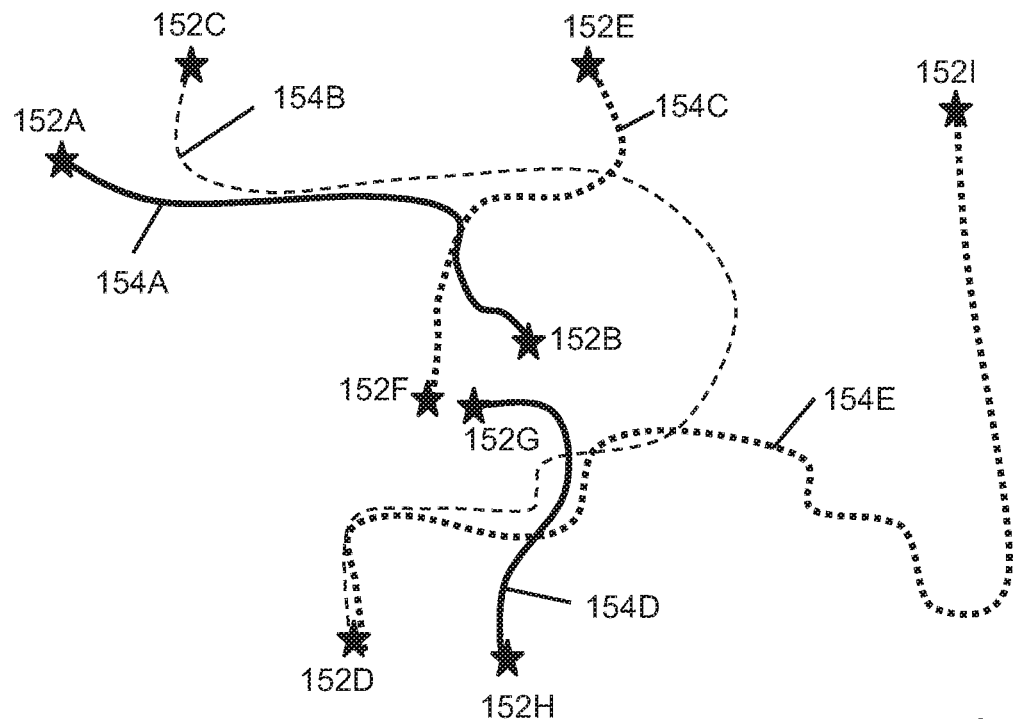
FIG. 4B is an excerpt of FIG. 4A including only the desired robot destinations and routes, omitting the physical map of the home environment.

FIG. 4B is an excerpt of FIG. 4A including only the desired robot destinations 152A-152I (collectively 152) and routes 154A-154E (collectively 154), while omitting the physical map of the home environment 150. As shown, a first route 154A connects desired robot destinations 152A-152B, a second route 154B connects desired robot destinations 152C, 152D, a third route 154C connects desired robot destinations 152E, 152F, a fourth route 154D connects desired robot destinations 152G, 152H, and a fifth route 154E connects desired robot destinations 152D, 152I.

Figure 4C:
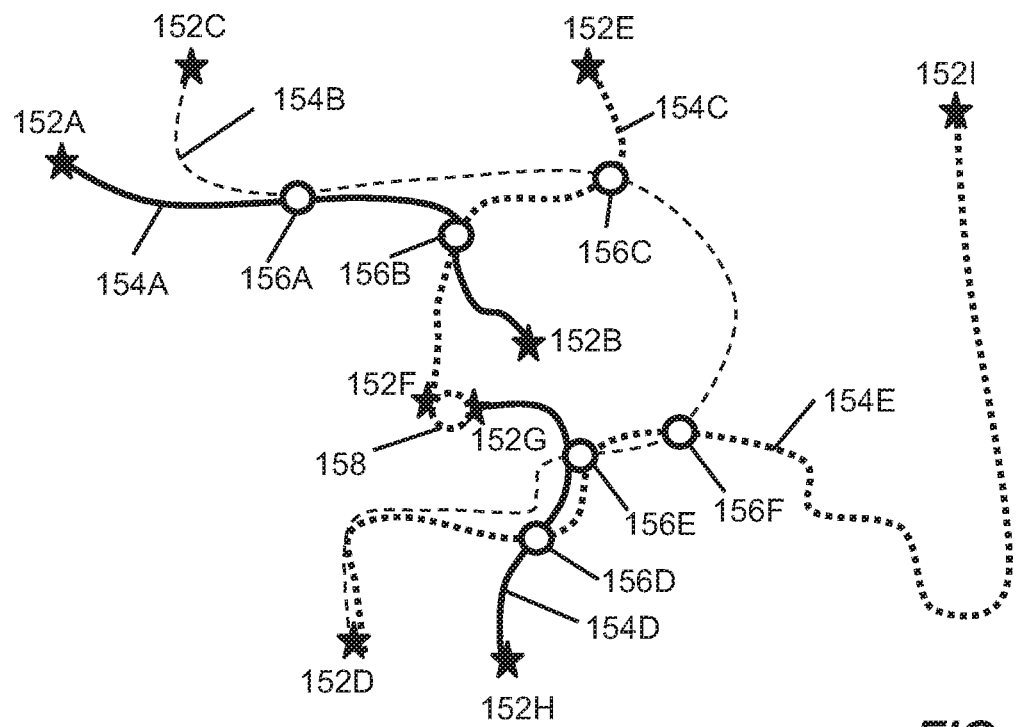
FIG. 4C provides the desired robot destinations and routes of FIG. 4B, with addition of points identifying overlaps between routes.

FIG. 4C provides a traversable, processed map including the desired robot destinations 152A-152I and routes 154A-154E of FIG. 4B, with addition of transfer points 156A-156F identifying overlaps between selected routes 152, and with addition of a merged destination 158 corresponding to two proximate desired robot destinations 152F, 152G. The traversable, processed map of FIG. 4C allows a mobile robot to choose one or more possible routes connecting any combinations of the desired robot destinations 152A-152I. The transfer points 156A, 156F may be defined by overlaps between different routes 154 and/or areas where different routes are sufficiently close to one another without presence of obstructions therebetween. The traversable, processed map may be used by a mobile robot during subsequent positioning and navigation within the environment 150 of FIG. 4A.

In many applications, it may be beneficial to generate maps of an environment and/or record routes through the environment during or following a single pass of a robot along the desired route. In such a scenario, one or more cameras of a robot camera will be exposed to limited view of the environment. As a result, a visual SLAM map will have visual features limited to those identified by the one or more cameras during passage of the robot through the route. To further improve a map, in certain embodiments a robot can be configured to execute additional maneuvers, while autonomously navigating along recorded routes, to capture additional points of view of the space in order to populate the map with additional visual features not captured within the view of the at least one camera of the robot during the original "training" pass of the robot along the desired route. Such additional maneuvers may include, but are not limited to, rotations in place at certain intervals, exploratory movement of the robot off the original training path in different directions, and/or a combination of rotations and exploratory movements. The frequency, extent, and/or types of additional maneuvers may be pre-set, may be manually adjusted (via configuration settings), and/or driven at least in part by calculation by a navigation system of the number of incremental features detected upon passage through a portion of the environment and/or execution of at least some additional maneuvers. In certain embodiments, a robot can be configured to periodically navigate along recorded paths, optionally executing additional maneuvers, to capture additional features that may have changed over time, such as due to human activity or other changes in the environment.

One aspect of the disclosure relates to a method for rapidly training a mobile robot configured for autonomous operation to navigate an unstructured residential environment, wherein the method comprises multiple steps. A first step includes identifying a set of desired robot destinations within the unstructured residential environment, wherein the set of desired robot destinations comprises at least four desired robot destinations (e.g., to form at least two pairs of desired robot destinations). Such identification may be performed by an operator to correspond to destinations where the mobile robot is likely to be able to provide assistance to a human user. A second step includes guiding the mobile robot (e.g., by an operator pulling or pushing the mobile robot) along paths between at least a minimum number of different pairs of desired robot destinations to enable establishment of full connectivity between each different pair of desired robot destinations. A third step, which may be performed concurrently with the second step, includes receiving operator input signals from an operator interface associated with the mobile robot, wherein the operator input signals are configured to start and stop recording of defined routes during the guiding of the mobile robot along the paths, wherein the defined routes identify routes to be used by the mobile robot during subsequent positioning and navigation operations. A fourth step includes recording images of surroundings experienced by the mobile robot during the guiding of the mobile robot along the paths (e.g., using at least one camera of the mobile robot). A fifth step includes creating a visual SLAM map of at least a portion of the unstructured residential environment from the images recorded by the mobile robot. The visual SLAM map may be stored in a memory associated with the mobile robot, and may be periodically updated based on images and/or sensory information obtained during use of the mobile robot.

In certain embodiments, the method further comprises mapping locations of the defined routes and desired robot destinations in the visual SLAM map of the at least a portion of the unstructured residential environment.

In certain embodiments, the method further comprises identifying overlaps or intersections between visual SLAM mapping information for different routes of the defined routes. In certain embodiments, provision of routes within a specified proximity of one another may constitute an overlap for purposes of defining a traversable, processed map.

In certain embodiments, the creating of the visual SLAM map is performed without prior establishment of any visual SLAM map for the unstructured residential environment, and/or without prior exploration of the unstructured residential environment by the mobile robot.

In certain embodiments, the method further comprises utilizing detection and mapping of visual features within the unstructured residential environment to create and/or update the visual SLAM map.

In certain embodiments, the defined routes constrain the mobile robot to operate only within a pre-defined or operator-defined distance of the defined routes, unless operation of the mobile robot outside the pre-defined or operator-defined distance of the defined routes is otherwise permitted by an operator of the mobile robot.

In certain embodiments, the method further comprises updating the visual SLAM map by an operator guiding the mobile robot along at least one path connecting at least one pair of newly identified or previously identified desired robot destinations, wherein the at least one path either overlaps a previously defined route or comes within a specified proximity of a previously defined route.

In certain embodiments, the method further comprises displaying at least one of (i) identification of desired robot destinations or (ii) identification of defined routes, plus identification of position of the mobile robot, on a visual user interface.

In certain embodiments, the mobile robot comprises (i) at least one first camera configured to detect infrared wavelengths, (ii) a first infrared illumination source configured to provide substantially non-structured, flood illumination of surroundings within a field of view of the at least one first camera, and (iii) at least one processor configured to control operation of the at least one first camera. In such an embodiment, the recording of images of surroundings experienced by the mobile robot comprises illuminating objects within a field of view of the at least one first camera during a plurality of first illumination intervals, and recording images during each illumination interval of the plurality of first illumination intervals using the at least one first camera.

In certain embodiments, the mobile robot further comprises at least one second camera configured to detect infrared wavelengths, and a structured infrared illumination source configured to cyclically illuminate surroundings within a field of view of the at least one second camera with a structured infrared illumination pattern during a structured illumination interval, wherein at least a portion of the field of view of the at least one second camera overlaps with the field of view of the first camera, wherein operation of the at least one second camera and the structured infrared illumination source is coordinated such that an exposure interval of the at least one second camera overlaps with at least a portion of the structured illumination interval, wherein the structured illumination source is inactive during the exposure interval of the first camera. In such an embodiment, the method further comprises: illuminating surroundings within a field of view of the at least one second camera with the structured infrared illumination pattern during the structured illumination interval, and capturing images of surroundings within the field of view of the at least one second camera during the structured illumination interval. In certain embodiments, the flood infrared illumination source is inactive during the exposure interval of the second camera.

In certain embodiments, the mobile robot comprises at least one sensor, and the method further comprises recording sensory information provided by the at least one sensor during the guiding of the mobile robot along the paths.

In certain embodiments, the method further comprises: causing the mobile robot to transit one or more routes and periodically capture images representative of 360 degree images of surroundings at multiple locations on the one or more routes; processing the periodically captured images; and supplementing the visual SLAM map using information obtained by the processing of the periodically captured images.

Figure 5A:
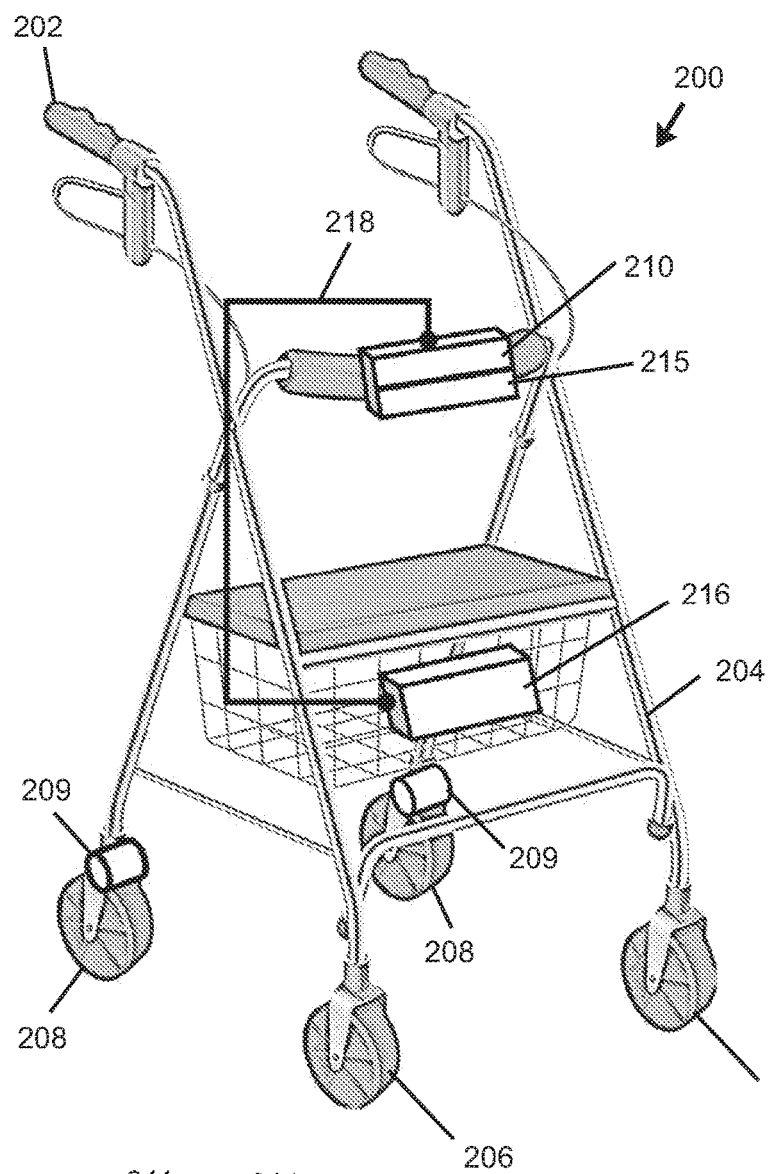
FIG. 5A is a perspective schematic view of a mobility assistance device incorporating a visual positioning system including infrared cameras, illumination sources, and at least one processor according to one embodiment.
Figure 5B:
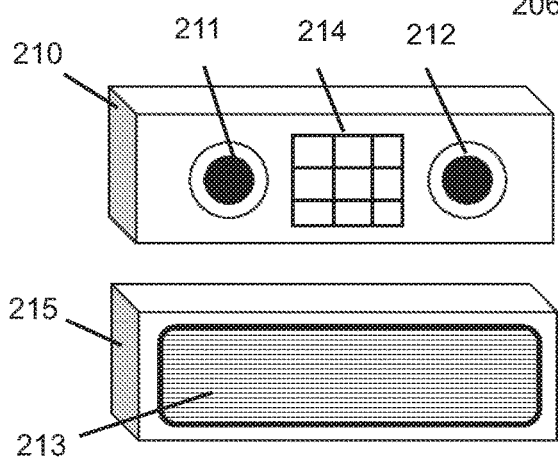
FIG. 5B is a perspective schematic view of housings including camera and illumination source components of the mobility assistance device of FIG. 5A.
Figure 5C:
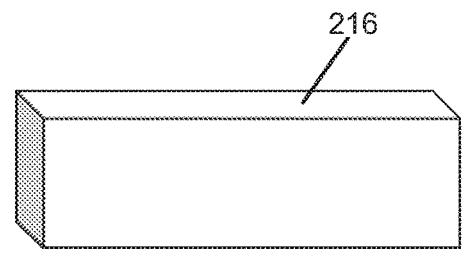
FIG. 5C is a perspective schematic view of a housing for processing and power supply circuitry of the mobility assistance device of FIG. 5A.

FIG. 5A is a perspective schematic view of a mobility assistance device 200 incorporating a visual positioning system as disclosed herein, with FIG. 5B providing a magnified view of first and second housings 210, 215 including camera and illumination source components thereof, and with FIG. 5C providing a magnified view of a third housing 216 for processing and power supply circuitry. The mobility assistance device 200 may embody a user-guiding rolling walker useable by a visually impaired user to help traverse an environment containing obstacles. The mobility assistance device includes handles 202 for supporting a user, a frame 204, and wheels 206, 208. In certain embodiments, all wheels 206, 208 are undriven but the rear wheels 208 include linear encoders 209 configured to sense wheel rotation and provide wheel rotation information to a visual SLAM module. In certain embodiments, the rear wheels 208 may be actively driven (e.g., using motors (not shown)). The mobility assistance device 200 may utilize components arranged in the first through third housings 210, 215, 216 mountable to the frame 204. The first housing 210 includes first and second infrared cameras 211, 212 and a structured infrared illumination source 214 configured to generate a structured illumination pattern. The second housing 215 includes a flood infrared illumination source 213. The presence of different housings for the illumination sources 213, 214 permits the illumination sources to be aimed in non-parallel directions, if desired. The third housing 216 contains other components, such as one or more processors, an inertial measurement unit, one or more sensors, and a battery (not shown). The various housings 210, 215, 216 may be connected by communication lines 218. In use, the first and second infrared cameras 211, 212 and corresponding infrared illumination sources 213, 214 may be used to generate a visual SLAM map of an environment, and thereafter identify obstacles within the environment to a user to help guide the user to a desired destination. Such identification may include audible and/or vibratory signals.

Figure 6:
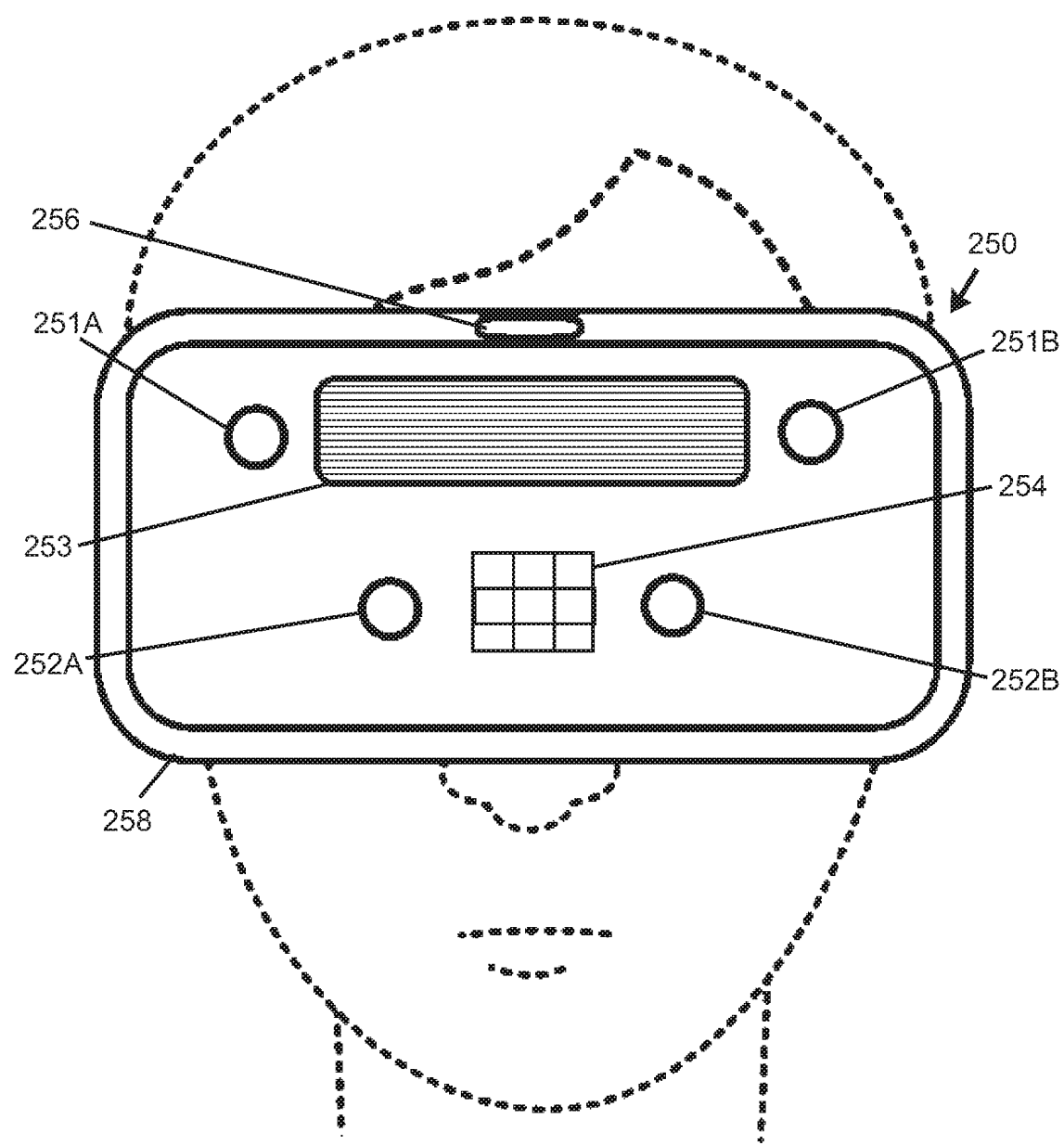
FIG. 6 is a front schematic view of a wearable mobile device including a virtual reality headset utilizing including infrared cameras, illumination sources, and at least one processor according to one embodiment.

FIG. 6 is a front schematic view of a wearable mobile device 250 embodied in a virtual reality headset (configured to be worn on the head of a user) incorporating a visual positioning system as disclosed herein. The wearable mobile device 250 includes a housing 258 and multiple forward-facing infrared cameras 251A-251B, 252A-252B as well as infrared illumination sources 253, 254 and at least one sensor 256. A first pair of infrared cameras 251A-251B may be configured to cooperate with a flood infrared illumination source 253 and used for localization of the mobile device 250 within an environment. A second pair of infrared cameras 252A-252B may be configured to cooperate with a structured infrared illumination source 254 and used for detection of obstacles within the environment. In use, the first and second pairs of infrared cameras 251A-251B, 252A-252B and corresponding infrared illumination sources 253, 254 may be used to generate (using a processor) a visual SLAM map of an environment, and thereafter identify obstacles within the environment to a user, such as may be useful in gaming or other entertainment activities in which a user of the mobile device is engaged.

Figure 7:
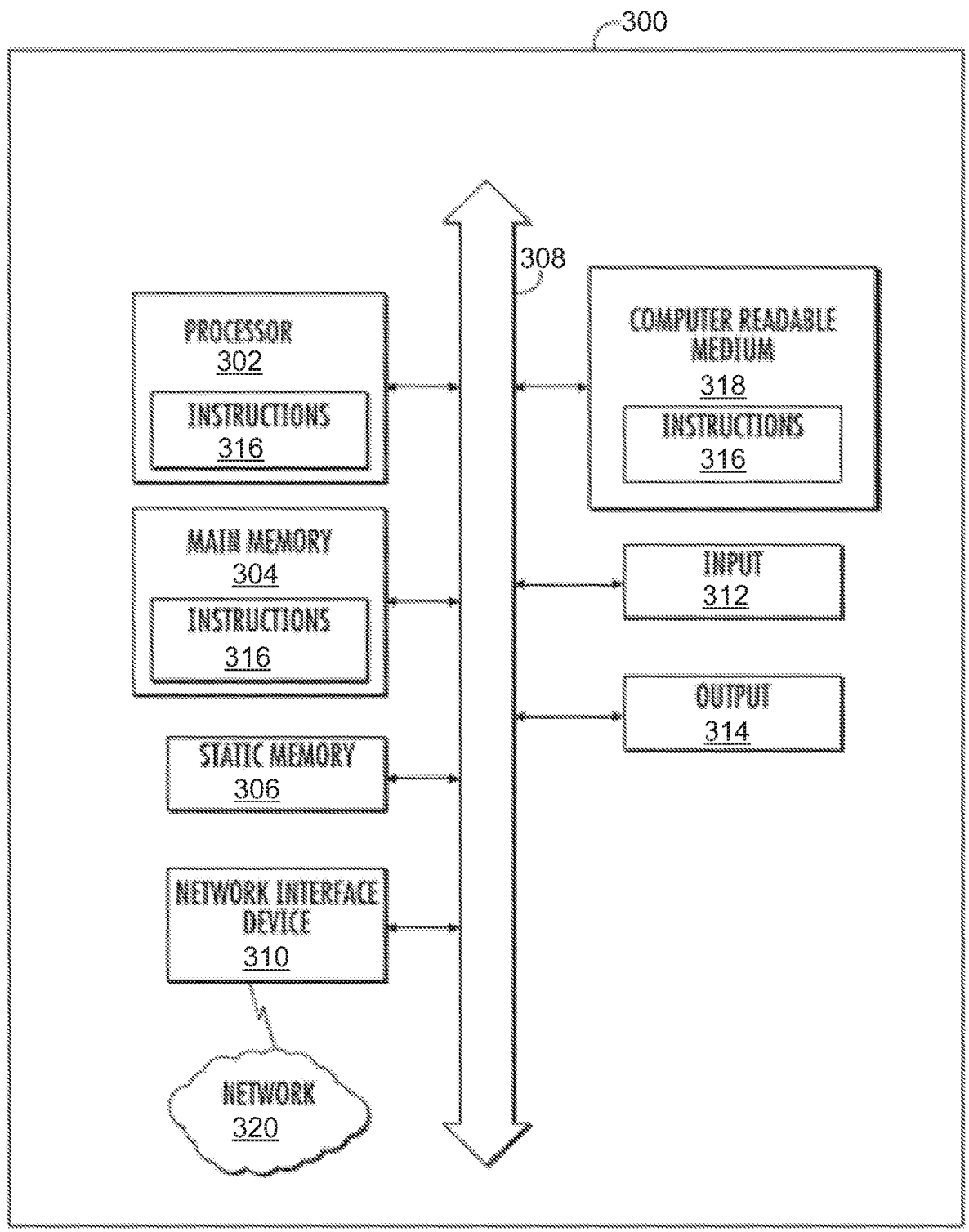
FIG. 7 is a generalized representation of a computing system that can be included in any component of the systems or methods disclosed herein.

FIG. 7 is a schematic diagram of a generalized representation of a computing system 300 (optionally embodied in a processor and/or computing device) that can be included in any component of the systems or methods disclosed herein. In this regard, the computing system 300 is adapted to execute instructions from a computer-readable medium to perform these and/or any of the functions or processing described herein. In this regard, the computing system 300 in FIG. 7 may include a set of instructions that may be executed to program and configure programmable digital signal processing circuits for supporting scaling of supported communications services. The computing system 300 may be connected (e.g., networked) to other machines in a local-area network (LAN), an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computing system 300 may be or include a circuit or circuits included in an application specific integrated circuit (ASIC)t, a programmable logic controller, an electronic board card, such as a printed circuit board (PCB), a server, a microcontroller, a personal computer, a smartphone, or any other suitable device.

In certain embodiments, a working copy of a visual SLAM map may be stored in one or more devices of the computing system 300. In certain embodiments, a working copy of the visual SLAM map may be stored and operated locally on a processing device 302 local to the mobile device. In certain embodiments, a working copy of the visual SLAM map may be stored and operated in at least one processor device remote from the mobile device and accessible via a network 320 (e.g., in a computer server or other device, optionally embodied in one or more Web-connected and/or cloud computing devices). In certain embodiments, a first part of a visual SLAM map may be stored and/or operated as a client or application on a processing device 302 local to the mobile device, and a second part of the visual SLAM map may be stored and/or operated remotely (e.g., on a computer server or one or more Web-connected and/or cloud computing devices accessible via the network 320), with the first part and the second part being configured to cooperate with one another.

The computing system 300 shown in FIG. 7 includes a processing device or processor 302, a main memory 304 (e.g., read-only memory (ROM), flash memory, dynamic random access memory (DRAM), such as synchronous DRAM (SDRAM), etc.), and a static memory 306 (e.g., flash memory, static random access memory (SRAM), etc.), which may communicate with each other via a data bus 308. Alternatively, the processing device 302 may be connected to the main memory 304 and/or static memory 306 directly or via some other connectivity means. The processing device 302 may be a controller, and the main memory 304 or static memory 306 may be any type of memory.

The processing device 302 represents one or more general-purpose processing devices, such as a microprocessor, central processing unit, or the like. More particularly, the processing device 302 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processing device 302 is configured to execute processing logic in instructions for performing the operations and steps discussed herein.

The computing system 300 may further include a network interface device 310. The computing system 300 also may or may not include an input 312, configured to receive input and selections to be communicated to the computing system 300 when executing instructions. The computing system 300 also may or may not include an output 314, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computing system 300 may or may not include a data storage device that includes instructions 316 stored in a computer readable medium 318. The instructions 316 may also reside, completely or at least partially, within the main memory 304 and/or within the processing device 302 during execution thereof by the computing system 300, the main memory 304 and the processing device 302 also constituting computer readable medium. The instructions 316 may further be transmitted or received over a network 320 via the network interface device 310.

While the computer readable medium 318 is shown in an embodiment to be a single medium, the term "computer-readable medium" should be taken to include a single medium or multiple media (e.g., a centralized or distributed database, and/or associated caches and servers) that store the one or more sets of instructions. The term "computer readable medium" shall also be taken to include any medium that is capable of storing, encoding, or carrying a set of instructions for execution by the processing device and that cause the processing device to perform any one or more of the methodologies of the embodiments disclosed herein. The term "computer readable medium" shall accordingly be taken to include, but not be limited to, solid-state memories, optical media, and magnetic media.

The embodiments disclosed herein include various steps. The steps of the embodiments disclosed herein may be executed or performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer readable medium) having stored thereon instructions which may be used to program a computing system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "analyzing," "processing," "computing," "determining," "displaying," or the like, refer to the action and processes of a computing system, or a similar electronic computing device, that manipulates and transforms data and memories represented as physical (electronic) quantities within registers of the computing system into other data similarly represented as physical quantities within the computing system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems is disclosed in the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer readable medium and executed by a processor or other processing device, or combinations of both. The components of the system described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an ASIC, a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer readable medium known in the art. A storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the embodiments may be combined. Those of skill in the art will also understand that information and signals may be represented using any of a variety of technologies and techniques. For example, data, instructions, commands, information, signals, bits, symbols, and chips, which may be referenced throughout the above description, may be represented by voltages, currents, electromagnetic waves, magnetic fields, particles, optical fields, or any combination thereof.

It will be apparent to those skilled in the art that various modifications and variations can be made to the present inventive technology without departing from the spirit and scope of the disclosure. Since modifications, combinations, sub-combinations and variations of the disclosed embodiments incorporating the spirit and substance of the inventive technology may occur to persons skilled in the art, the inventive technology should be construed to include everything within the scope of the appended claims and their equivalents.

The invention claimed is:

1. A visual positioning system for a mobile device, the visual positioning system comprising:
   at least one first camera configured to detect infrared wavelengths, and configured to supply images to a visual SLAM module;
   at least one second camera configured to detect infrared wavelengths;
   a first infrared illumination source configured to provide substantially non-structured, flood illumination of an environment within a field of view of the at least one first camera during a first illumination interval;
   a second infrared illumination source configured to provide a structured infrared illumination pattern within an environment within a field of view of the at least one second camera during a second illumination interval; and
   at least one processor configured to control operation of the at least one first camera, the at least one second camera, the first infrared illumination source, and the second infrared illumination source;
   wherein:
      the at least one first camera includes a first exposure interval and the at least one second camera includes a second exposure interval;
      the first exposure interval at least partially overlaps with the first illumination interval, with the second infrared illumination source being inactive during the first exposure interval;
      the second exposure interval at least partially overlaps with the second illumination interval, and
      the second exposure interval is non-coincident with the first exposure interval.

2. The visual positioning system of claim 1, wherein the first illumination interval at least partially overlaps with the second exposure interval.

3. The visual positioning system of claim 1, wherein:
   at least a portion of the field of view of the second camera overlaps with the field of view of the first camera.

4. The visual positioning system of claim 3, wherein the second exposure interval is non-overlapping with the first exposure interval.

5. The visual positioning system of claim 1, wherein the first camera comprises a global shutter.

6. The visual positioning system of claim 1, wherein the at least one processor is configured to (i) evaluate exposure of images captured by the first camera, and (ii) vary the exposure interval of the first camera responsive to the evaluation of exposure of images captured by the first camera.

7. The visual positioning system of claim 1, further comprising at least one inertial measurement unit configured to supply to the visual SLAM module signals indicative of changes in orientation and acceleration of the mobile device.

8. The visual positioning system of claim 1, wherein one or more of (i) the at least one first camera or (ii) the at least one second camera comprises at least one stereo infrared camera.

9. The visual positioning system of claim 1, further comprising at least one sensor associated with the mobile device, wherein the visual positioning system is configured for recording (i) video information and/or images captured by the at least one camera, and (ii) sensory information provided by at least one sensor, during manual or autonomous navigation of the mobile device within an environment;
   wherein the at least one processor is configured for processing recorded video information and/or images captured by the at least one camera, and for processing sensory information provided by the at least one sensor, to create and/or update a visual SLAM map of the environment.

10. A mobile device comprising an autonomous or semi-autonomous mobile vehicle and the visual positioning system of claim 1.

11. The mobile device of claim 10, wherein the autonomous or semi-autonomous vehicle is configured for operation within indoor environments.

12. A mobile device comprising the visual positioning system of claim 1, wherein the mobile device is configured to be worn by a human or animal user.

13. A visual positioning system for a mobile device, the visual positioning system comprising:
   at least one camera configured to detect infrared wavelengths;
   a first infrared illumination source configured to provide substantially non-structured, flood illumination of an environment within a field of view of the at least one camera during a first illumination interval;
   a second infrared illumination source configured to provide a structured infrared illumination pattern within an environment within a field of view of the at least one camera during a second illumination interval; and
   at least one processor configured to control operation of the at least one camera, the first infrared illumination source, and the second infrared illumination source;
   wherein the at least one camera includes a first exposure interval and a second exposure interval;
   wherein the first exposure interval at least partially overlaps with the first illumination interval;

wherein the second exposure interval at least partially overlaps with the second illumination interval; and wherein at least a portion of the first illumination interval overlaps with the second illumination interval during the second exposure interval.

14. The visual positioning system of claim 13, wherein the first illumination interval overlaps with an entirety of the second illumination interval during the second exposure interval.

15. The visual positioning system of claim 13, wherein the second illumination interval is non-overlapping with the first exposure interval.

16. The visual positioning system of claim 13, wherein the at least one camera comprises at least one stereo infrared camera.

17. The visual positioning system of claim 13, wherein:
the at least one camera comprises at least one first camera and at least one second camera;
the first infrared illumination source is configured to provide substantially non-structured, flood illumination of an environment within a field of view of the at least one first camera during a first illumination interval;
the second infrared illumination source is configured to provide the structured infrared illumination pattern in an environment within a field of view of the at least one second camera during a second illumination interval;
the at least one first camera comprises the first exposure interval; and
the at least one second camera comprises the second exposure interval.

18. The visual positioning system of claim 17, wherein at least a portion of the field of view of the at least one second camera overlaps with the field of view of the at least one first camera.

19. The visual positioning system of claim 13, wherein:
the at least one camera is configured to supply images to a visual simultaneous localization and mapping (visual SLAM) module; and
the processor is configured, and a sensitivity of the at least one camera and an output intensity of the first infrared illumination source are selected, to provide consistent exposure of images obtained by the at least one camera to enable localization and navigation of the mobile device using a single visual SLAM map across a variety of environmental lighting conditions.

20. The visual positioning system of claim 19, further comprising at least one inertial measurement unit configured to supply to the visual SLAM module signals indicative of changes in orientation and acceleration of the mobile device.

21. The visual positioning system of claim 13, further comprising at least one sensor associated with the mobile device, wherein the visual positioning system is configured for recording (i) video information and/or images captured by the at least one camera, and (ii) sensory information provided by at least one sensor, during manual or autonomous navigation of the mobile device within an environment;
wherein the at least one processor is configured for processing recorded video information and/or images captured by the at least one camera, and for processing sensory information provided by the at least one sensor, to create and/or update a visual SLAM map of the environment.

22. The visual positioning system of claim 13, wherein the at least one processor is configured to (i) evaluate exposure of images captured by the at least one camera, and (ii) vary the exposure interval of the at least one camera responsive to the evaluation of exposure of the images.

23. A mobile device comprising an autonomous or semi-autonomous mobile vehicle and the visual positioning system of claim 13.

24. A mobile device comprising the visual positioning system of claim 13, wherein the mobile device is configured to be worn by a human or animal user.

* * * * *